United States Patent
Sadakuni et al.

(12)

(10) Patent No.: US 7,789,183 B2
(45) Date of Patent: Sep. 7, 2010

(54) PERSONAL SNOW VEHICLE

(75) Inventors: Naoki Sadakuni, Irvine, CA (US);
David Takashi Takamoto, Placentia, CA (US); David Hughes, Los Angeles, CA (US)

(73) Assignee: Yamaha Motor Corp., U.S.A., Cypress, CA (US)

( * ) Notice: Subject to any disclaimer, the term of this patent is extended or adjusted under 35 U.S.C. 154(b) by 229 days.

(21) Appl. No.: 11/765,993

(22) Filed: Jun. 20, 2007

(65) Prior Publication Data

US 2008/0017431 A1 Jan. 24, 2008

Related U.S. Application Data

(60) Provisional application No. 60/816,759, filed on Jun. 26, 2006.

(51) Int. Cl.
*B62M 27/00* (2006.01)
(52) U.S. Cl. .................................................. 180/190
(58) Field of Classification Search ................. 180/186, 180/190, 193
See application file for complete search history.

(56) References Cited

U.S. PATENT DOCUMENTS

| | | | |
|---|---|---|---|
| 4,307,788 A | 12/1981 | Shelton | |
| 4,613,006 A | 9/1986 | Moss et al. | |
| 4,633,964 A * | 1/1987 | Boyer et al. | 180/190 |
| 4,708,353 A | 11/1987 | Evequoz | |
| 4,719,983 A | 1/1988 | Bruzzone | |
| 4,768,794 A | 9/1988 | Bibollet | |
| 4,984,648 A | 1/1991 | Strzok | |
| 5,351,975 A | 10/1994 | Petoud | |
| 5,516,126 A | 5/1996 | Myers | |
| 5,518,080 A * | 5/1996 | Pertile | 180/190 |
| 5,568,840 A | 10/1996 | Nagata et al. | |
| 5,662,186 A | 9/1997 | Welch | |
| 5,947,220 A | 9/1999 | Oka et al. | |
| 5,996,717 A | 12/1999 | Hisadomi | |
| 6,112,840 A * | 9/2000 | Forbes | 180/193 |
| 6,164,670 A * | 12/2000 | Abarca et al. | 280/12.14 |
| 6,170,589 B1 | 1/2001 | Kawano et al. | |
| 6,193,003 B1 | 2/2001 | Demptster | |
| 6,234,263 B1 | 5/2001 | Boivin et al. | |

(Continued)

OTHER PUBLICATIONS

AD Boivin, http://www.adboivin.com/flash/index.html, May 13, 2005.

(Continued)

*Primary Examiner*—Kevin Hurley
(74) *Attorney, Agent, or Firm*—Knobbe, Martens, Olson & Bear, LLP

(57) ABSTRACT

A straddle-type personal snow vehicle includes a body frame, an engine, a front support and a rear track drive mechanism that is driven by the engine. The front support may be a front suspension that supports at least one front ski. The rear track drive mechanism may be supported by a rear suspension that may include multiple linkage members. In one arrangement, the track drive mechanism includes a drive wheel and at least a first support wheel. An axis of rotation of the first support wheel is positioned forward of an axis of rotation of the drive wheel. In one arrangement, the at least one front ski is coupled to the front suspension by a tool-less attachment mechanism.

22 Claims, 30 Drawing Sheets

U.S. PATENT DOCUMENTS

| | | | |
|---|---|---|---|
| 6,234,264 B1 | 5/2001 | Boivin et al. | |
| 6,279,923 B1 * | 8/2001 | Cardillo et al. | 280/12.14 |
| 6,321,864 B1 * | 11/2001 | Forbes | 180/193 |
| 6,382,338 B1 * | 5/2002 | Forbes | 180/193 |
| 6,435,290 B1 | 8/2002 | Justus et al. | |
| D476,599 S | 7/2003 | Whittington | |
| 6,652,422 B1 | 11/2003 | Day | |
| 6,698,540 B1 | 3/2004 | Decker, Jr. | |
| 6,708,791 B2 * | 3/2004 | Alexander | 180/182 |
| 6,736,414 B2 | 5/2004 | Farrally-Plourde | |
| 7,316,284 B2 * | 1/2008 | Lefort | 180/190 |
| 7,357,201 B2 * | 4/2008 | Jordan | 180/9.26 |
| 2003/0214105 A1 | 11/2003 | Sullivan et al. | |
| 2004/0079571 A1 | 4/2004 | Laver et al. | |
| 2004/0238251 A1 | 12/2004 | Oron et al. | |
| 2004/0262064 A1 * | 12/2004 | Lefort | 180/190 |

OTHER PUBLICATIONS

Fast Trax Stand-Up Snow Vehicle, http://www.off-road.com/snowmobile/news/latest/fasttrax/fasttrax.html, Jan. 17, 2006.

Honda Press Information, http://www.honda.co.jp/news/1996/296124.html, May 16, 2005.

*Honda's Showmobile . . . Fact or Hoax?* Snowmobile Interactive News Magazine, http://www.snowmobile.ca, Jan. 17, 2006.

*Sled-Scooter Hits the Market*, Snowmobile Interactive News Magazine, http://www.snowmobile.ca, May 16, 2005.

Snow Hawk 600 H.O. , http://www.snow-hawk.com/flash/index.html, Jan. 17, 2006.

SwitchBlade-The New Freedom from 2Moto, Inc. http://www.snomoto.com/index.htm, May 13, 2005.

XtremeSno,Inc. XSR85, "Extreme Products for Extreme Sports", http:/www.xtremesno.com/, 2005 in 4 pages, May 13, 2005.

* cited by examiner

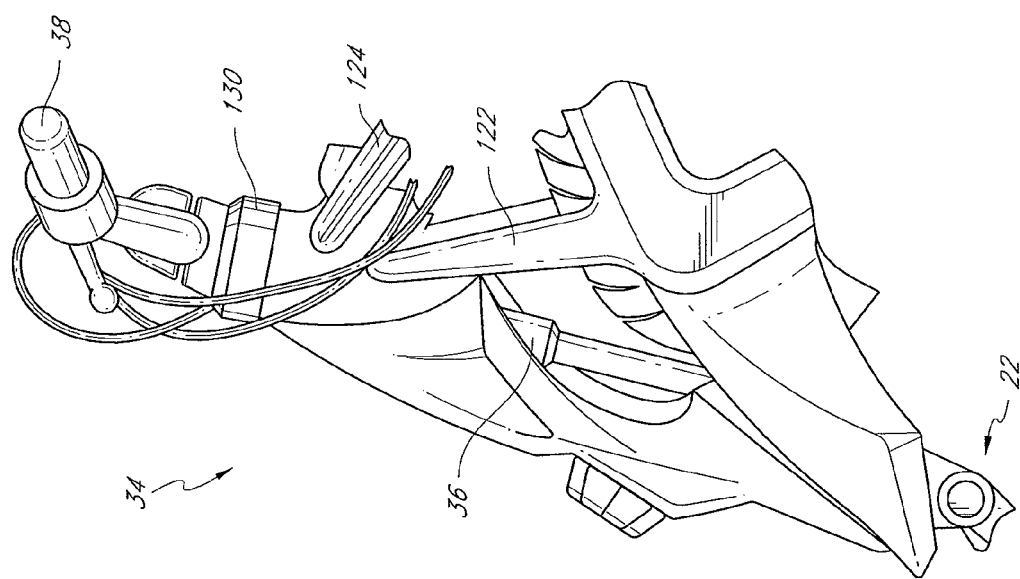

PERSONAL SNOW VEHICLE

RELATED APPLICATION

This application is related to, and claims the benefit of, U.S. Provisional Patent Application 60/816,759, filed Jun. 26, 2006, the entirety of which is incorporated by reference herein and made a part of the present specification.

FIELD OF THE INVENTION

The present invention relates to a vehicle and, in particular, to a motorized personal snow vehicle that has at least one steering ski.

BACKGROUND OF THE INVENTION

1. Field of the Invention

The present invention relates to track-driven vehicles. More particularly, the present invention relates to a motorized personal snow vehicle that has at least one steering ski.

2. Description of the Related Art

Track-driven vehicles intended for use on snow-covered surfaces are known. One example of such a vehicle is a snowmobile. Snowmobiles are characterized by a low vehicle body having a relatively wide stance. A typical snowmobile employs a straddle-type seating arrangement and is steerable by a set of handlebars. The handlebars steer a pair of spaced-apart skis. The vehicle is propelled by a forward-mounted engine that drives a relatively wide, rearwardly-positioned track.

More recently, attempts have been made to provide a personal, track-driven snow vehicle that provides a riding experience closer to a motorcycle than a snowmobile. Such vehicles are generally taller and narrower than a typical snowmobile. However, such attempts generally have not successfully provided the desired motorcycle-like riding experience.

SUMMARY OF THE INVENTION

The present invention involves several features for a vehicle (e.g., a snow vehicle), no single of which is solely responsible for all of its desirable attributes. Without limiting the scope of this invention, its more prominent features will be discussed briefly. After considering this discussion, and particularly after reading the Detailed Description of the Preferred Embodiments section below in combination with this section, one will understand how the features of this invention provide several advantages over like features (e.g., suspension systems and track drives) on prior vehicles.

One aspect of the invention involves a snow vehicle with a forkless front suspension system to which a steering ski is attached at a pivot connection. The suspension system includes a rear swingarm, a front elbow segment and at least one shock absorbing device. The rear swingarm is pivotally coupled to a body of the vehicle and to the pivot connection. The swing linkage at least principally lies to the rear side of the pivot connection. The front elbow segment includes first and second links that are pivotally connected to form an elbow. The first link is also pivotally connected to the pivot connection and the second link is pivotally connected to the vehicle body. The front elbow section largely lies to the front side of the pivot point; however, in some embodiments, the pivot connection between the vehicle body and the second link can lie to the rear side of or above the pivot connection. The shock absorbing device operates between the pivot connection and the vehicle body and is pivotally coupled to at least one of the vehicle body and the pivot connection. In some embodiments, the front elbow segment and the rear swingarm can be configured such that when the shock absorbing device compresses the pitch of the ski increases to raise the tip of the ski relative to its aft end. Additionally, the suspension system can provide an anti-dive feature when a braking force is applied to the vehicle.

Another aspect of the invention relates to a snow vehicle having a front suspension and a steering ski releasably attached to the front suspension. A tool-less connection secures the steering ski to at least a portion of the front suspension. The connection accordingly can be located either at the lowermost point of the suspension or at an intermediate point between the upper and lower parts of the suspension. In this latter form, a lower portion of the suspension would be detached from an upper portion of the suspension when removing the ski from the vehicle. In some embodiments, the tool-less connection can include a release pin with a detent mechanism operable by a push plunger. In other embodiments, the tool-less connection can be configured similar to a snow-ski binding used with a ski boot. In some embodiments, the lower remaining section of the suspension is adapted to be connected to another article, such as, for example, a wheel or a lock-down boss on a transportation platform. Thus, the releasable connection permits one to exchange ski types to optimize the vehicle's handling characteristics for different riding conditions (e.g., hard packed, slushy, or powder) or for the rider's skill level, as well as permits one to remove the ski removal to ease transportation to and from a recreational area.

An additional aspect of the invention involves a steering ski for a snow vehicle. The ski has an hourglass-shaped body with wider fore and aft ends than a midsection of the ski. The bottom surface of the ski includes a generally flat center section (with or without a central keel) with outer side sections that rise above the center section and terminate at corresponding outer edges of the ski. At least a portion of one of the outer side sections can include a double-chine construction so as to define at least one edge on the bottom of the ski that is disposed inboard of the corresponding outer edge. At least some of the edges of the ski can be metal or a similarly hard material.

Another aspect of the invention involves a braking system for a snow vehicle. The braking system includes one or more strakes that normally reside in an un-extended position on the vehicle body, steering ski or drive track mechanism. The braking system can also include an actuator. In one embodiment, the actuator is manually controlled and, when moved, causes the braking strake to extend from the vehicle and engage the ground. In another embodiment, the braking system includes a brake mechanism that acts on a drive wheel of a track drive mechanism of the vehicle.

A further aspect of the invention relates to a compliant rear suspension for a track-driven snow vehicle. The suspension system includes a parallel linkage arrangement that includes at least one swingarm. In one arrangement, the at least one swingarm comprises an upper swingarm and a lower swingarm. The at least one swingarm supports a drive wheel of a track drive mechanism off a rear side of the vehicle body. In one arrangement the drive wheel is supported by the lower swingarm and in another arrangement the drive wheel is supported by the upper swingarm. The at least one swingarm is pivotally coupled to the vehicle body at a first pivot point and to the drive wheel at a second pivot point. The linkage arrangement also includes a third pivot point that is disposed above the track drive mechanism and that is linked with the second pivot point by the structure of the suspension and/or track drive systems. An upper link couples the third pivot point to a fourth pivot point, which couples the upper link to the vehicle body (e.g., the vehicle frame). In one arrangement, the upper link is a swingarm that has a variable length. In some embodiments, a shock absorber defines at least part of the upper link to permit the link length to decrease under at least some riding conditions. Other mechanisms that provide the upper link with a variable length are also practicable with the suspension system. In some embodiments, an additional shock absorbing device can operate between the vehicle body and the swingarm to dampen shocks transferred from the track drive mechanism to the vehicle body.

In use, the rear suspension system supports the track drive mechanism such that a lower section of the track engages with and runs generally parallel to the ground (e.g., snow). As the vehicle rides over undulating terrain, the parallel linkage of the rear suspension system permits the track drive mechanism to move relative to the vehicle body while maintaining the lower track section in an orientation generally parallel to the ground. When landing a jump, however, the aft portion of the drive track mechanism tends to contact the ground first. The compliant upper link thus permits the aft end of the drive track mechanism to rotate relative to the mechanism's drive wheel to soften the landing.

A further aspect of the invention involves a drive train for a track-driven snow vehicle that permits free-wheeling of the track when the track spins faster than the engine. In some embodiments, a one-way clutch (e.g., a Sprag clutch) is disposed within a transmission mechanism that operates between the engine and a drive wheel of the track drive mechanism. For example, the one-way clutch can operate between a driven sprocket next to the drive wheel and the axle of the drive wheel. In this manner, the drive wheel can rotate faster than the engine when landing a jump. In other embodiments, however, the ability to free-wheel can be selectively permitted by a controller on the vehicle to maintain engine braking. For example, the controller can activate the one-way clutch only during those operating conditions when no load is sensed on the engine.

An additional aspect of the present invention involves a drive track mechanism for a snow vehicle. The drive track mechanism includes a drive wheel and one or more idle wheels that are all linked together by a support frame (or suspension). An endless track extends about the wheels. In one arrangement, at least one idler wheel is positioned forward of the drive wheel such that an axis of rotation of the at least one idler wheel is forward of an axis of rotation of the drive wheel. In some arrangements, the axis of rotation of the at least one idler wheel may be forward of a leading edge of the drive wheel. In some arrangements, the track is easily removed from the vehicle without significantly disassembling the vehicle. In one embodiment, the frame supports the wheels from only one side of the vehicle. In another embodiment, the frame is disposed on both sides of the track; however, on one side of the frame, those frame positions that extend above or in front of the track can be quickly removed to permit the track to be slide on or off the wheels. In an additional embodiment, the track includes a quick connect mechanism (e.g., alligator clips) that allows installation and removal of the track without disassembling the support frame.

Another aspect of the invention relates to improving the riders comfort on a snow vehicle. The vehicle preferably includes a heated seat. The seat can be heated using a heat exchanger, a portion of the exhaust system, or both. For example, the heat exchanger can be directly located beneath or integrated into the seat with a coolant from the engine circulating through the heat exchanger. In another embodiment, a portion of the exhaust system (e.g., a silencer) can be disposed beneath or integrated into the seat. In these manners, the seat can be warmed for the rider.

The exhaust system can also be configured such that at least a portion of the discharged exhaust gases impinge upon the soles of the rider's feet when resting/standing on foot pegs, platforms, wells or the like on the vehicle's body. Hand grips can also be warmed by using electric heaters or by circulating warmed engine coolant through a lumen within the grips or the handlebar.

A further aspect of the invention relates to a vehicle having a frame and body panels. The body panels are coupled with the frame (or similar support structure on the frame) by clips or similar fastener devices that permit the body panels to be easily attached to the vehicle frame. The body panels preferably are available in a plurality of colors, patterns, shapes and sizes and can come with variable indicia on them. In this manner, the vehicle can be easily customized for or by a user/purchaser to provide a seemingly unique vehicle appearance.

An additional aspect of the invention involves a vehicle (e.g., a snow vehicle, land vehicle, or water vehicle) that includes one or more mounts for a recording device or transmitter (e.g., video camera). The mounts can be located at one or more locations on the vehicle, such as, for example, on the handlebars (facing either forward or at the rider), next to a front ski or wheel (facing either forward or rearward), and behind the front ski or wheel at a position either low on the vehicle frame or closer to the seat. In some embodiments, each mount can provide a plurality of orientations for the video camera. In some embodiments, protective framing can be provided around the mount.

Another aspect of the invention relates to a transportation dolly for use with a personal snow vehicle. The dolly includes a platform, onto which the snow vehicle can be loaded, and a plurality of wheels supporting the platform. Preferably, at least some of the wheels can swivel relative to the platform and at least some of the wheels can be locked when loading the snow vehicle onto the platform. The platform can also include one or more tie downs or attachment bosses to which a portion of the snow vehicle can be attached (e.g., the lower end of the front suspension after the steering ski has been removed as described above). In some embodiments, the dolly cooperates with a trailer to ease loading of the snow vehicle onto the trailer. In some embodiments, the dolly cooperates with a conventional hitch receiver on the back of a truck or automobile. In a more preferred embodiment, the dolly includes an integral lift mechanism (e.g., a ball-screw device) that permits a hitch tongue on the dolly to engage the hitch receiver with the platform supported on the wheels. The lift mechanism can then be operated (e.g., via a crank) to raise the platform relative to the hitch tongue and lift it off the ground for transportation.

A transportation system that includes the dolly and the hitch receiver can also include additional framing or structure that interacts with the snow vehicle to lock the vehicle on the back of the truck or car without the use of straps or rope. For example, the structure can include one or more clips that snap onto a frame or other portions of the snow vehicle to secure the snow vehicle onto the back of the truck or car.

BRIEF DESCRIPTION OF THE DRAWINGS

These and other features, aspects, and advantages of the present invention will now be described in connection with preferred embodiments of the invention shown in the accompanying drawings. The illustrated embodiments, however, are merely examples and are not intended to limit the invention. The drawings include the following eighteen (18) figures.

FIG. 7 is an enlarged side elevational view of a steering assembly of the personal snow vehicle of FIG. 1.

FIGS. 16A-16D illustrate possible alternative arrangements to prevent relative rotation of the upper and lower tubes of the single telescoping tube assembly.

DETAILED DESCRIPTION OF PREFERRED EMBODIMENTS

As used herein, the term "snow vehicle" is a broad term and is used in its ordinary meaning and includes, without limitation, snow scooters, snowmobiles, and the like. The aspects and features of the invention (including those noted above) can be used with a snow vehicle; however, several of such aspects and features also can be used with other vehicle types (e.g., motorcycles, ATVs, personal watercraft, etc). For the sake of further describing the aspects and features of invention, the following describes a "personal snow vehicle"—a powered snow vehicle that can accommodate one or two riders—as such aspects and features are particularly well suited for use with this type of vehicle. To aid in the description of the vehicle, the term "longitudinal" refers to a direction, length or location between the front and back of the vehicle, and the term "lateral" refers to a direction, length or location between the sides of the vehicle.

Figure 1:
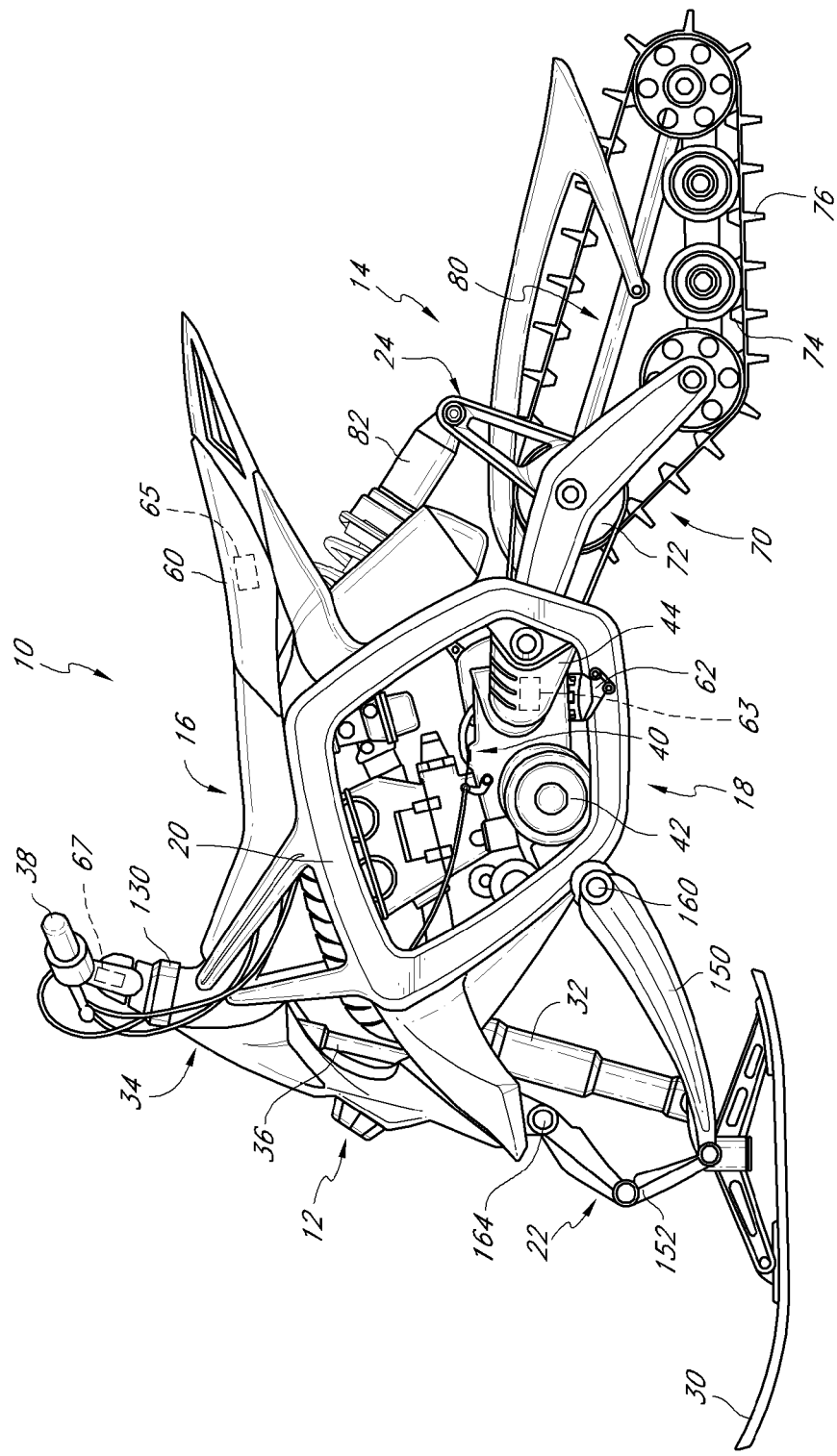
FIG. 1 is a side elevational view of a personal snow vehicle configured in accordance with a preferred embodiment of the present invention.

With reference to FIG. 1, the personal snow vehicle 10 has a front suspension 22 (which can serve as a "front support") disposed on a front portion 12 of the personal snow vehicle 10 and a rear suspension 24 disposed on a rear portion 14 of the vehicle 10. The front suspension 22 and the rear suspension 24 support a vehicle body including a vehicle body frame 20. The front suspension 22 is attached to at least one ski 30 which contacts the ground. The front suspension 22 extends vertically upward from the ski 30 and supports a front portion of the vehicle body frame 20. The front suspension 22 preferably includes at least one front shock absorber 32 for absorbing forces applied on the ski 30 during operation of the vehicle 10. The front suspension 22 operates about a steering assembly 34, which includes a steering shaft 36 and handlebars 38. The handlebars 38 are attached to a mounting bracket disposed on an upper end of the steering shaft 36.

The steering shaft 36 is coupled to the front ski 30 such that rotational movement of the handlebars 38 causes the ski 30 to rotate to steer the personal snow vehicle 10. In the illustrated embodiment, the steering shaft 36 is directly coupled to the ski 30. An upper portion of the steering shaft 36 is supported by the vehicle body frame 20 and a head pipe 130. The head pipe 130, which is part of the steering assembly 34, houses bearings that allow the upper portion of the steering shaft 36 to rotate freely. In one embodiment, the upper portion of the steering shaft 36 is prevented from moving axially. An upper end of the upper portion of the steering shaft 36 is coupled to the handlebars 38 and a lower end of the upper portion of the steering shaft 36 is coupled to a universal joint. The universal joint is then coupled to an intermediate portion of the steering shaft 36. The intermediate portion of the steering shaft 36 is connected to a lower portion of the steering shaft 36 through a sliding connection. This sliding connection allows the intermediate portion and the lower portion of the steering shaft 36 to slide axially, allowing the front suspension 22 to translate in a generally vertical direction. In one embodiment, the sliding connection does not allow the intermediate portion and the lower portion of the steering shaft 36 to rotate axially.

In another embodiment of the present snow vehicle 10, the upper portion of the steering shaft 36 is supported by the vehicle body frame 20 and the head pipe 130. The head pipe 130 contains bearings that allow the upper portion of the steering shaft 36 to rotate freely. The upper portion of the steering shaft 36 is prevented from moving axially. The handlebars 38 are coupled to the upper end of the upper portion of the steering shaft 36. The lower end of the upper portion of the steering shaft 36 is coupled to a crank arm. The intermediate portion of the steering shaft 36 is coupled to the vehicle body frame 20 through a set of bearings that allow the steering shaft 36 to pivot about an axis that is independent of an upper steering tube axis. The intermediate portion of the steering shaft 36 is preferably located towards the center of the vehicle, substantially aligned with a central vertical plane of the vehicle. However, the intermediate portion of the steering shaft 36 can be positioned at any angle to minimize the distance between the upper portion of the steering shaft 36 and the lower portion of the steering shaft 36. The intermediate portion of the steering shaft 36 has crank arms fastened to both an upper end and a lower end. The upper portion of the steering shaft 36 and the intermediate portion of the steering shaft 36 are coupled via a first connecting link with spherical rod ends at either end. The lower crank arm of the intermediate portion of the steering shaft 36 can be coupled to a ski pivot crank arm, for example, by a second connecting link with spherical rod ends at either end. In one preferred embodiment, the lower end of the intermediate portion of the steering shaft 36 is located at least partially between an upper pivot point 164 of an angled suspension arm 152 and an upper pivot point 160 of an elongated suspension arm 150 of the front suspension 22.

The vehicle body frame 20 supports a power train 40 between the front and rear suspensions 22, 24. The power train 40 includes an engine 42 and a transmission 44. The engine 42 has a cylinder body (i.e., cylinder block, cylinder head(s) and crankcase), an induction system connected to the cylinder body, and controls for controlling various aspects of the engine and other components on the vehicle 10. An exhaust system routes exhaust gases from the cylinder body to the atmosphere. In the illustrated embodiment, the exhaust system includes at least one silencing device to quiet exhaust noise. Further aspects of the exhaust system are described below.

The vehicle body frame 20 also supports a seat 60 which is disposed on an upper portion 16 of the vehicle body frame 20. In one embodiment, at least a portion of the seat 60 is disposed above the power train 40 of the vehicle 10 and extends over top of the power train 40. In the illustrated arrangement, the seat 60 extends over the cylinder block of the engine 42, which is canted forwardly. Such an arrangement advantageously provides the illustrated personal snow vehicle 10 with a lower and more centrally located center of gravity in comparison to prior art motorcycle-like snow vehicles.

Figure 2:
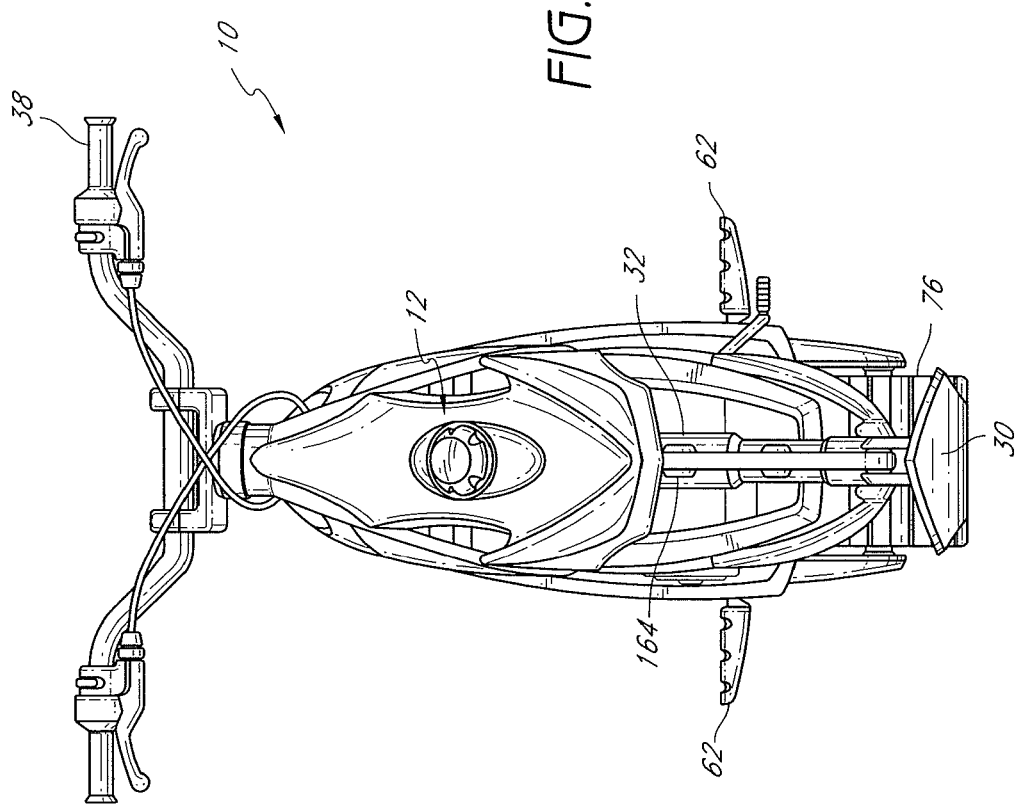
FIG. 2 is a front view of the personal snow vehicle of FIG. 1.
Figure 3:
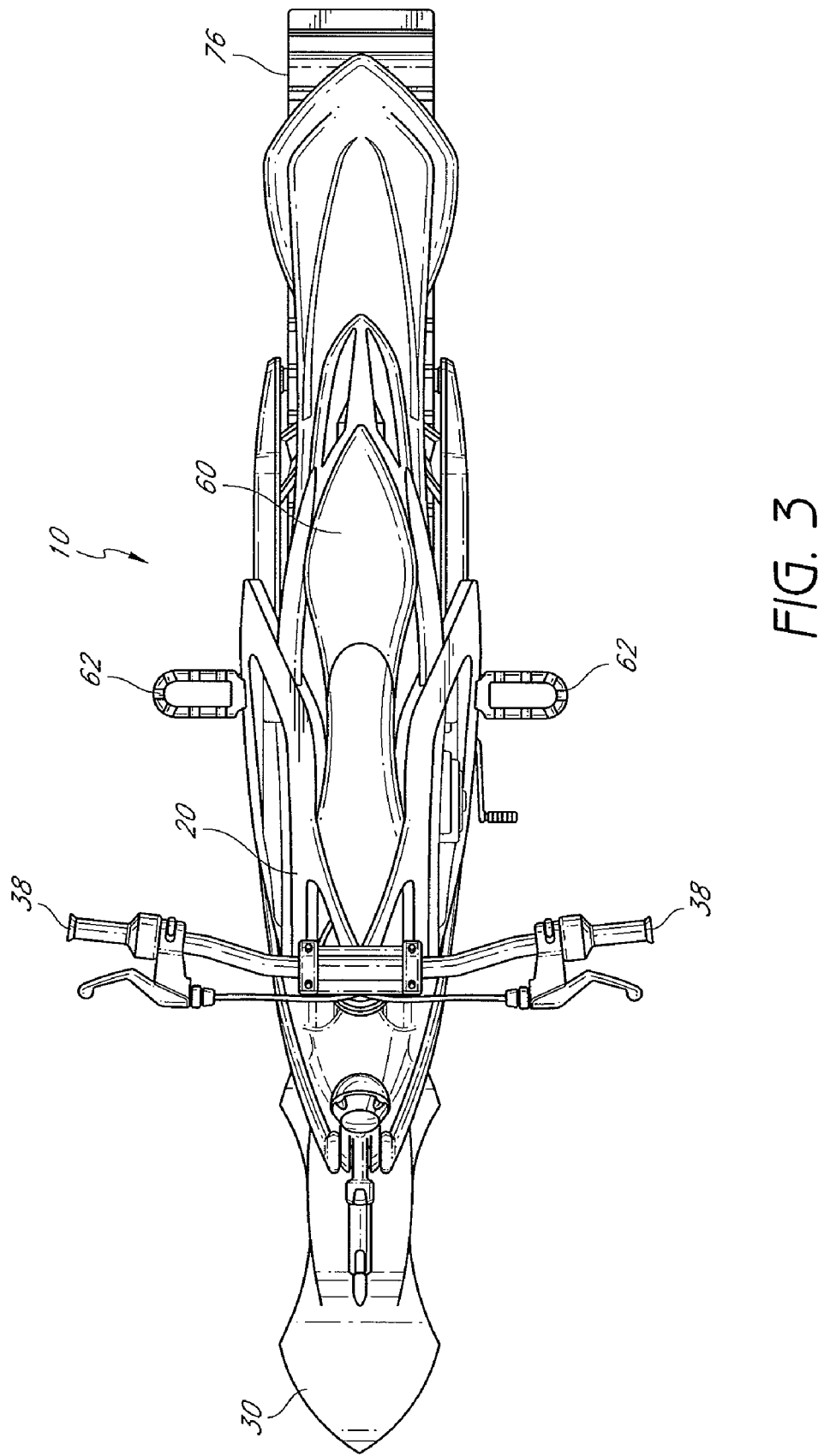
FIG. 3 is a top view of the personal snow vehicle of FIG. 1.

Foot pegs 62 are disposed on a lower portion 18 of the vehicle body frame 20 to support a rider's feet during operation of the vehicle 10. One foot peg 62 is placed on each side of the personal snow vehicle 10, as illustrated in FIGS. 2 and 3. A longitudinal position of the left side foot peg 62 is shown in FIG. 1, and the right side foot peg 62 is similarly positioned on the right side of the vehicle. As illustrated in FIGS. 2 and 3, the personal snow vehicle 10 has a relatively narrow stance. That is, in the illustrated arrangement, the snow vehicle 10 is supported on a surface by at least one front ski 30 and a track 76 that define a maximum width of contact with the surface that is narrower than the lateral distance between the foot pegs 62 and narrower than the lateral distance between the hand grip portions of the handlebars 38. In one arrangement, the contact width is approximately the same as a lateral dimension of the body frame 20. This relatively narrow contact width between the snow vehicle 10 and a surface upon which it is operated facilitates the motorcycle-like ride characteristics of the personal snow vehicle 10.

The engine 42 is connected to the drive mechanism 70 so as to provide at least forward propulsion of the personal snow vehicle 10. The drive mechanism 70 includes a drive wheel 72, a track arm assembly 74, and the removable track 76. The drive wheel 72 is connected to the transmission 44 of the power train 40 and rotates the track 76 at least partially about the drive wheel 72. The removable track 76 can be attached to and detached from the track arm assembly 74 and drive wheel 72. When attached to the track arm assembly 74, the removable track 76 contacts the ground in a rear portion 14 of the vehicle 10 and, when driven, propels the personal snow vehicle 10. The drive mechanism 70 can also include a freewheel mechanism 73 (FIG. 10H) operably positioned between the engine 42 and the removable track 76, wherein the freewheel mechanism 73 permits the removable track 76 to rotate faster than a speed at which it would otherwise be driven by the engine 42.

The rear suspension 24 of the snow vehicle of FIGS. 1-9 includes a single swingarm rear suspension arrangement. An alternative arrangement of the rear suspension 24 is shown in FIGS. 10A-10F. The rear suspension 24 of FIGS. 10A-10F includes a parallel linkage system 80 and a rear shock 82. The parallel linkage system 80 comprises a series of members coupled together such that the series of members remain in a generally parallel configuration when the rear suspension 24 is displaced at least partially upward by a vertical force applied from the ground to the rear suspension 24 and the removable track 76. Each of these rear suspension arrangements, and others, are described in greater detail below.

Figure 4:
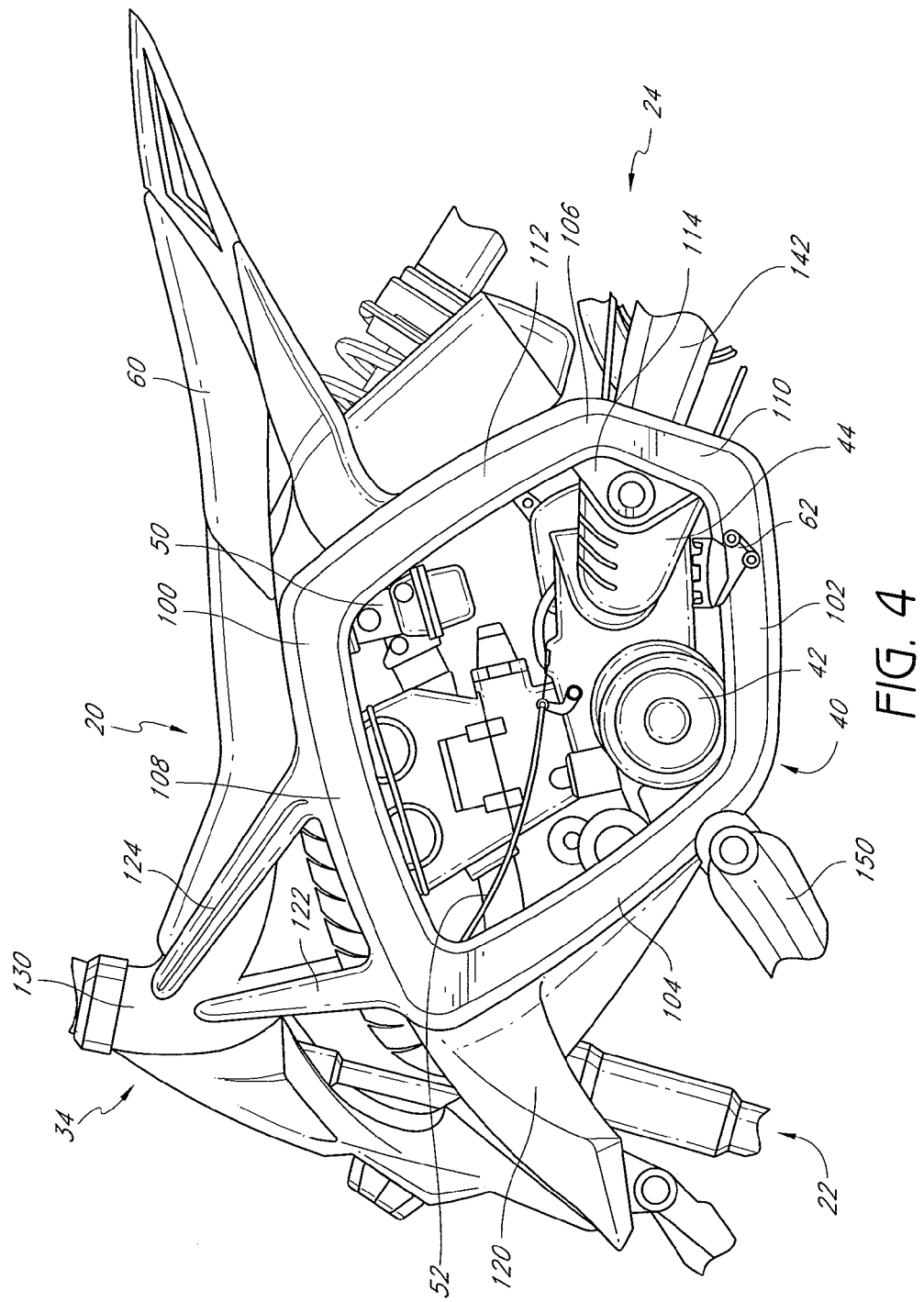
FIG. 4 is an enlarged side elevational view of a vehicle body frame housing a portion of a power train of the personal snow vehicle of FIG. 1.

As shown in FIG. 4, the vehicle body frame 20 comprises an engine cage 100 that houses the power train 40 of the vehicle 10. The engine cage 100 has a lower member 102 disposed on a lower portion 18 of the vehicle 10 substantially near the foot pegs 62. The lower member 102 of the engine cage 100 is connected to a front member 104 and a rear member 106. The front member 104 extends generally upward from the lower member 102 and at least partially toward the front portion 12 of the vehicle 10 in the longitudinal direction. The rear member 106 also extends generally upward from the lower member 102.

In one embodiment, the rear member 106 comprises a short component 110 and a long component 112. The short component 110 is coupled to the lower member 102 and extends generally upward from the lower member 102. The short component 110 of the rear member 106 extends at least partially toward the rear portion 14 of the vehicle 10. The long component 112 is connected to the short component 110 of the rear member 106 so as to define an angle 114. In one embodiment, the angle 114 is less than 180°. The long component 112 extends generally upward and at least partially toward the front portion 12 of the vehicle 10. In one embodiment, the front member 104 and the long component 112 of the rear member 106 are generally parallel.

The upper member 108 of the engine cage 100 couples the rear member 106 to the front member 104. In one embodiment of the personal snow vehicle 10, as shown in FIG. 2, the upper member 108 is inclined downward when extending from the rear member 106 toward the front portion 12 of the vehicle 10.

A front suspension support member 120 extends outward in a longitudinal direction from the front member 104 of the engine cage 120. The front suspension support member 120 couples the engine cage 100 to the front suspension 22 of the vehicle 10, and provides support to the front suspension 22 so as to maintain a generally vertical configuration of the front suspension 22.

The engine cage 100 is coupled to the steering assembly 34 by a lower pipe support member 122 and an upper pipe support member 124. The lower pipe support member 122 extends generally upward from the location in which the front member 104 and upper member 108 of the engine cage 100 connect, which is disposed at a front portion 12 of the vehicle 10. The upper pipe support member 124 extends generally upward and forward from a central portion of the upper member 108 of the engine cage 100. In one embodiment, the lower pipe support member 122 and the upper pipe support member 124 are coupled to the head pipe 130 of the steering assembly 34.

A front portion of the vehicle body frame 20 is supported at least in part by the front suspension 22 of the vehicle 10. Similarly, a rear portion of the vehicle body frame 20 is supported at least in part by the rear suspension 24 of the vehicle 10. In one embodiment, an elongated suspension arm 150 of the front suspension 22 is coupled to a lower portion of the front member 104 of the engine cage 100 to support the vehicle body frame 20. A support member 142 of the rear suspension 24 is coupled to the short component 110 of the rear member 106 of the engine cage 100 to further support the vehicle body frame 20.

The vehicle body frame 20 as described above can be composed of a variety of materials. For example, in one embodiment, the vehicle body frame 20 is composed of a plastic resin material. A plastic resin material is advantageous because it is lightweight and provides sufficient strength and durability so as to withstand typical forces and impacts experienced during operation of the personal snow vehicle. In other embodiments, the vehicle body frame 20 is constructed of a metal alloy, such as a steel alloy, an aluminum alloy, a titanium alloy, or any combination thereof, or any other suitable material.

The above description of the vehicle body frame 20 comprising an engine cage 100 was made with reference to only one side of the personal snow vehicle 10. That is, as shown in the FIG. 2, the above description describes a vehicle body frame 20 disposed on a left side of the snow vehicle 10. The vehicle body frame 20 comprising an engine cage 100 on the right side of the vehicle is substantially similar to the vehicle body frame 20 as described above. As a result, the structure of the vehicle body frame 20 disposed on the right side of the vehicle 10 will not be repeated because it is substantially similar to the description of the vehicle body frame 20 disposed on the left side of the vehicle 10 as set forth above.

The personal snow vehicle 10 can have quick-change body panels that can be attached to and detached from any component or components of the vehicle body frame 20. The quick-change body panels are preferably easy to attach and detach so that a rider can quickly change the external appearance of the personal snow vehicle 10. The quick-change body panels can have a variety of different shapes, sizes, and colors. Advantageously, a rider can easily customize the look of the personal snow vehicle 10 to conform to a rider's particular aesthetic preferences or to conform to the particular environment in which the snow vehicle 10 is being used.

With continued reference to FIG. 4, a power train 40 has an engine 42 and a transmission 44 for powering the snow vehicle 10. The engine 42 can be any suitable device for powering a personal snow vehicle. In one embodiment, the engine 42 is a single cylinder internal combustion engine having a single combustion chamber. The combustion chamber is defined by a cylinder head, a piston, and a cylinder bore. A cylinder block of the engine 42 can define the cylinder bore. The piston can reciprocate in a generally vertical direction to drive a crank shaft. The rotational energy of the crank shaft is selectively transferred to the transmission 44 of the vehicle 10. The illustrated engine 42, however, merely exemplifies one type of engine which can be employed in the personal snow vehicle 10. Engines having any number of cylinders, other cylinder arrangements, various cylinder orientations (e.g., upright cylinder banks, V-type, and W-type), and operating on various combustion principles (e.g., four stroke, crankcase compression two-stroke, diesel, and rotary) are all practicable for use with the personal snow vehicle 10 disclosed herein.

The engine 42 includes an induction system 50 to provide air to the at least one combustion chamber of the engine 42. The at least one combustion chamber communicates with the induction system 50 via at least one air intake passage. Many known systems exist for controlling the amount of induction air that flows in the engine 42. For example, the induction system 50 can include a throttle valve configured to control the amount of air flowing through the induction system 50 to the engine 42.

The engine 42 also includes a fuel delivery system that receives fuel from the fuel tank and produces a fuel charge which is delivered to the at least one cylinder of the engine 42. The fuel delivery system may be integrated with the induction system 50. For example, a carburetor may be provided that includes a throttle valve to control intake air flow and also mixes fuel with the intake air to produce the fuel charge. In other arrangements, a fuel injector may be provided. In addition, any suitable intake air regulating valve may be employed.

The engine 42 also includes an exhaust system 50 for transferring exhaust gases from the at least one combustion chamber to a location outside of the engine 42. An exhaust passage communicates with the at least one combustion chamber and extends toward a rear portion 14 of the vehicle 10. The exhaust system 50 may include an exhaust pipe that communicates with the combustion chamber at a first end and a muffler, or silencer, at a second end. The exhaust pipe passes exhaust gases from the combustion chamber to the silencer, which reduces the sound level of the exhausted gases.

The engine 42 is housed within the engine cage 100 and is disposed generally below the seat 60. In one preferred arrangement, an uppermost portion of the engine 42 is lower than at least a portion of the upper surface of the seat 60. In addition, a portion of the seat 60 may extend over top of a portion of the engine 42. In one embodiment, the engine 42 is disposed approximately in the center of the vehicle, both longitudinally and laterally. That is, the engine 42 is configured in the longitudinal direction between the front 12 and the rear portion 14 of the vehicle 10. In the lateral direction, the engine 42 is preferably disposed between a left side and a right side of the vehicle 10. As a result, a rider of the snow vehicle 10 straddles the engine 42. Because the engine 42 is relatively heavy when compared to other components of the personal snow vehicle 10, positioning the engine 42 in the center of the vehicle 10 enhances the stability and smooth operation of the vehicle 10 in a variety of environments and terrains.

Due to the overall configuration of the present snow vehicle 10, the engine 42 is disposed relatively low to the ground in the vertical direction. As a result, the personal snow vehicle 10 has a relatively low center of gravity. Advantageously, such a relatively low center of gravity also enhances the stability and smooth operation of the vehicle 10 under a variety of operating conditions because a low center of gravity reduces the likelihood that the present snow vehicle 10 will becoming unstable and tip over during operation.

Figure 5:
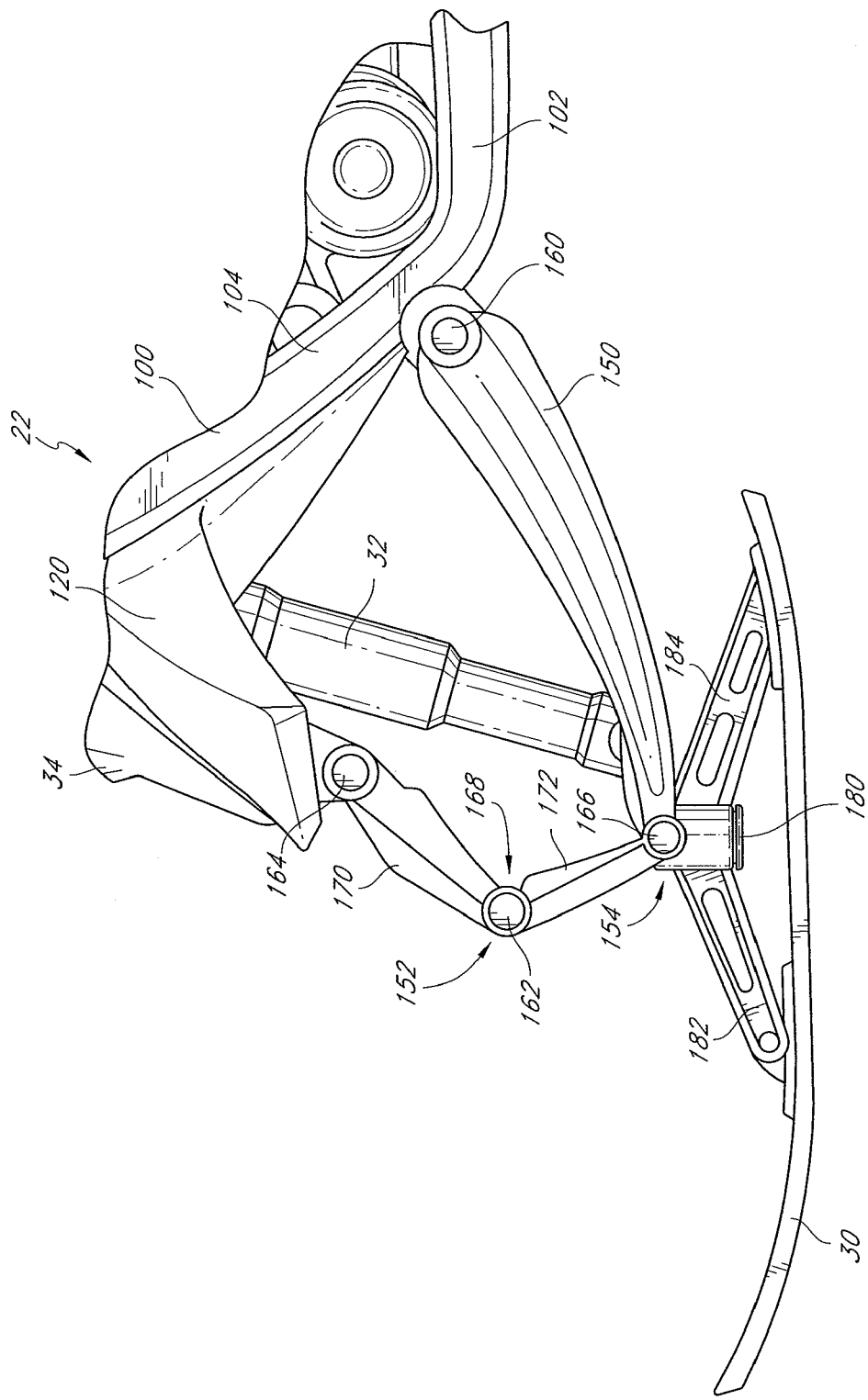
FIG. 5 is an enlarged side elevational view of a front suspension of the personal snow vehicle of FIG. 1.

As shown in FIGS. 4 and 5, the front suspension 22 generally comprises a front shock 32, an elongated suspension arm 150, an angled suspension arm 152, an attachment mechanism 154, at least one ski 30, and a series of pivot points linking the various members of the front suspension 22. The front shock 32 is connected at its upper end to the front suspension support member 120 of the vehicle body frame 20. The front shock 32 extends downward and at least partially forward from the front suspension support member 120 and is coupled to a lower, forward portion of the elongated suspension arm 150.

The elongated suspension arm 150 connects the front suspension 22 to the engine cage 100. An upper portion of the elongated suspension arm 150 is coupled to the engine cage 100 substantially near the intersection of the lower member 102 and the front member 104 of the engine cage 100. A pivot point 160 defines the connection of the elongated suspension arm 150 and the engine cage 100 of the vehicle body frame 20 such that the elongated suspension arm 150 can pivot and rotate relative to the engine cage 100 about the pivot point 160. In the arrangement shown in FIG. 4, the pivot point 160 is located vertically below the cylinder block of the engine 42, which is canted forwardly from a vertical direction. Such an arrangement permits a relatively rearward placement of the suspension arm 150 to facilitate the relatively central location of the center of gravity of the personal snow vehicle 10. A lower portion of the elongated suspension arm 150 is coupled to the front shock 32, which extends upward therefrom. The lower portion of the elongated suspension arm 150 is also coupled to the attachment mechanism 154.

The angled suspension arm 152 is disposed generally in front of the front shock 32 and the elongated suspension arm 150. The angled suspension arm 152 comprises an upper member 170 and a lower member 172 that are pivotally connected about a pivot point 162. The upper member 170 of the angled suspension arm 150 is connected to the steering assembly 34 of the snow vehicle 10. A pivot point 164 defines the connection of the upper member 170 and the steering assembly 34 so as to enable the upper member 170 of the angled suspension arm 152 to pivot and rotate relative to the steering assembly 34 of the vehicle 10. The lower member 172 is disposed below the upper member 170 and, at one end, is connected to the upper member 170 at another pivot point 162. As a result, the upper member 170 and the lower member 172 can pivot and rotate relative to each other so as to increase or decrease an angle 168 defined by the upper member 170 and the lower member 172. At the other end, the lower member 172 is coupled to the attachment mechanism 154.

A central pivot point 166 defines the connection of the front shock 32, the elongated suspension arm 150, and the angled suspension arm 152 to the attachment mechanism 154. The front shock 32 is preferably rigidly connected to the lower portion of the elongated suspension arm 150, which is pivotally connected to the attachment mechanism 154. As a result, the front shock 32 preferably is not capable of pivoting or rotating with respect to the attachment mechanism 154 and/or the elongated suspension arm 150. However, the central pivot point 166 enables both the elongated suspension arm 150 and the angled suspension arm 152 to pivot and rotate with respect to the attachment mechanism 154.

The attachment mechanism 154 attaches the at least one ski 30 to the other components of the front suspension 22 of the personal snow vehicle 10. The attachment mechanism 154 can constitute a variety of suitable configurations. In one embodiment, the attachment mechanism 154 comprises a central component 180, a front extension 182, and a rear extension 184. The central component 180 is disposed adjacent and below the central pivot point 166. The rear extension 184 extends downward and rearward so as to be attachable to a rear portion of the at least one ski 30. The front extension 182 extends downward and forward so as to be attachable to a central or front portion of the at least one ski 30.

The attachment mechanism 154 is preferably configured to enable the at least one ski 30 to attach to and detach from the attachment mechanism 154. In one embodiment, the attachment mechanism 154 comprises a tool-less attachment mechanism that allows a rider to quickly and easily remove the at least one ski 30 from the snow vehicle 10 or install the at least one ski 30 on the snow vehicle 10 without requiring the use of any auxiliary tools. The tool-less attachment mechanism can be a binding-like attachment mechanism similar to those used to bind a traditional snow ski or a snowboard to a user's ski or snowboard boot. In another embodiment, the attachment mechanism 154 can have a release pin which engages and secures the at least one ski 30 when in an attached position and disengages and releases when the at least one ski 30 is detached from the attachment mechanism 154.

Advantageously, the attachment mechanism 154 allows a rider of the personal snow vehicle 10 to easily detach and attach the at least one ski 30. As a result, the rider, for example, can remove the at least one ski 30 and attach a carrier and/or transportation dolly to the personal snow vehicle 10 assisting in transporting the vehicle. The transportation dolly and carrier are described in detail below with reference to FIGS. 10A and 10B and FIGS. 11A through 11C, respectively. In addition, the rider can exchange ski types and configurations depending on the given weather or riding conditions. Thus, the personal snow vehicle 10 may be equipped with multiple skis 30, or additional skis 30 may be available as an accessory. Furthermore, the rider can attach a wheel to the personal snow vehicle 10 for applications requiring a wheel and drive track combination such as for transporting the snow vehicle or for operation on certain terrain in which a wheel is desirable (e.g., competitions held on grass covered surfaces).

In some arrangements, the front suspension 22 preferably comprises a forkless front suspension linkage. The forkless front suspension linkage provides a higher degree of stability when a rider applies the brakes since steering of the vehicle 10 is generally not affected by braking. Advantageously, this anti-dive feature of the personal snow vehicle 10 results in enhanced vehicle stability and rider comfort during operation of the personal snow vehicle 10.

The series of pivots points of the front suspension 22 allow the components of the front suspension 22 to rotate and pivot relative to each other during operation of the vehicle. Advantageously, the illustrated linkage system raises the ski pitch when a sufficient force is applied to the at least one ski 30 resulting in compression of the components of the front suspension 22.

In another embodiment (not shown), the present personal snow vehicle 10 includes two front skis: a first ski and a second ski. The first ski and the second ski are preferably positioned side-by-side and relatively close together in a front portion 12 of the vehicle 10. The first ski and the second ski are coupled to the front suspension 22. The first ski and second ski move and rotate about a roll axis. Advantageously, such a two-ski configuration provides additional edges so as to enable the personal snow vehicle 10 to execute relatively tight turns and improve overall handling of the snow vehicle 10.

Figure 6B:
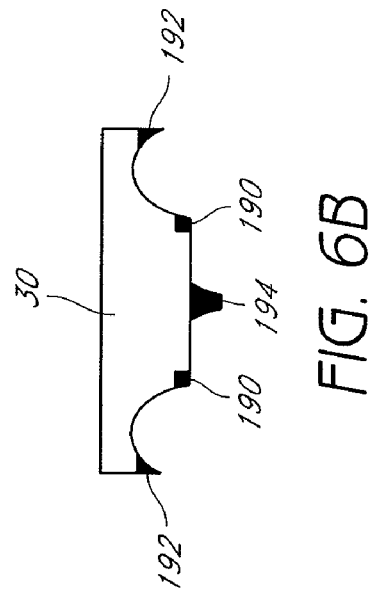
FIG. 6B is a front elevational view of the ski of FIG. 4A.
Figure 6A:
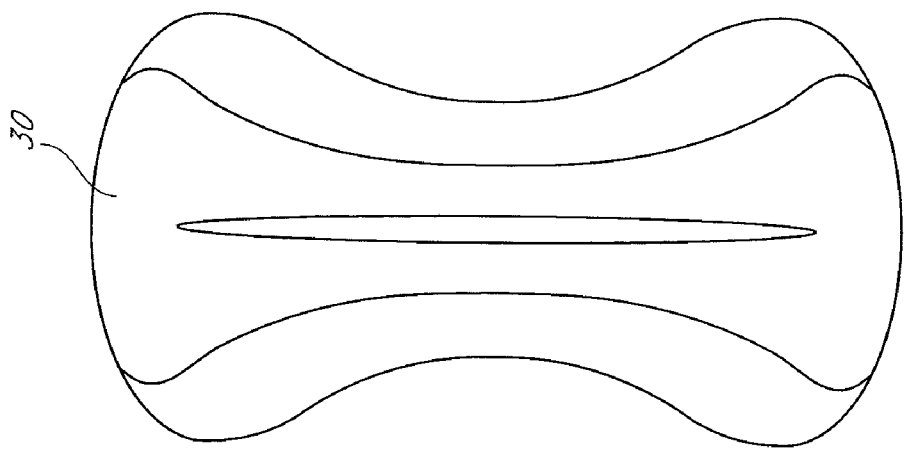
FIG. 6A is a bottom view of one embodiment of an at least one ski of the personal snow vehicle of FIG. 1.

With reference now to FIG. 6A, the at least one ski 30 can take a variety of forms and configurations. The desired shape and size of the ski 30 will vary depending upon riding conditions and the rider's skill level. Unlike conventional snowmobile skis, the at least one ski 30 preferably is designed for relatively hard-packed snow conditions. In one embodiment, the at least one ski 30 has generally parabolic shaped side surfaces with rounded ends and is similar in overall shape to a typical snowboard. In this embodiment, the at least one ski 30 has its minimum width at a central portion of the at least one ski 30. A front portion and a rear portion of the at least one ski 30 have a greater width than the central portion such that the at least one ski 30 has a generally hourglass configuration.

As shown in FIG. 6B, the at least one ski 30 can have a first edge 190 and a second edge 192 on each side of the at least one ski 30 when viewed from the front. Such a double chine-like construction of the at least one ski 30 enables the personal snow vehicle 10 to execute relatively tight turns because the first edge 190 and the second edge 192 contact the ground when turning the vehicle. In one embodiment, the first edge 190 and the second edge 192 are composed of a metal alloy. As apparent in FIG. 6B, the second edges 192 may be spaced above the first edges 190. In addition, a surface between the edges 190 and 192 may be concave. In addition, the at least one ski 30 may include a lower keel 194, which may extend at least partially along a length of the ski 30 in alignment with a central axis of the ski 30. The keel 194 can help the ski 30 track in a straight line by adding stability to the ski 30 and also provide an additional edge when turning.

With reference to FIG. 7, the steering assembly 34 generally comprises a steering shaft 36, a head pipe 130, and handlebars 38. The steering assembly 34 is generally disposed in a front portion 12 of the snow vehicle 10 and at least partially above the front suspension 22. The steering shaft 36 extends upward from the front suspension 22 and connects to the handlebars 38 at an upper portion 16 of the vehicle 10. The head pipe 130 is disposed around an upper portion of the steering shaft 36 substantially near the handlebars 38. The head pipe 130 defines an inner bore through which the steering shaft 36 extends. As discussed above with reference to FIG. 4, the head pipe 130 is coupled to the vehicle body frame by the lower pipe support member 122 and the upper pipe support member 124.

When a rider of the snow vehicle 10 turns the handlebars 38, the steering shaft 36 of the steering assembly 34 rotates corresponding to the direction in which the handlebars 38 are turned. The steering shaft 36 transmits this rotation to the front suspension 22, and the at least one ski 30 correspondingly rotates so as to turn the vehicle in a desired direction.

Figure 8:
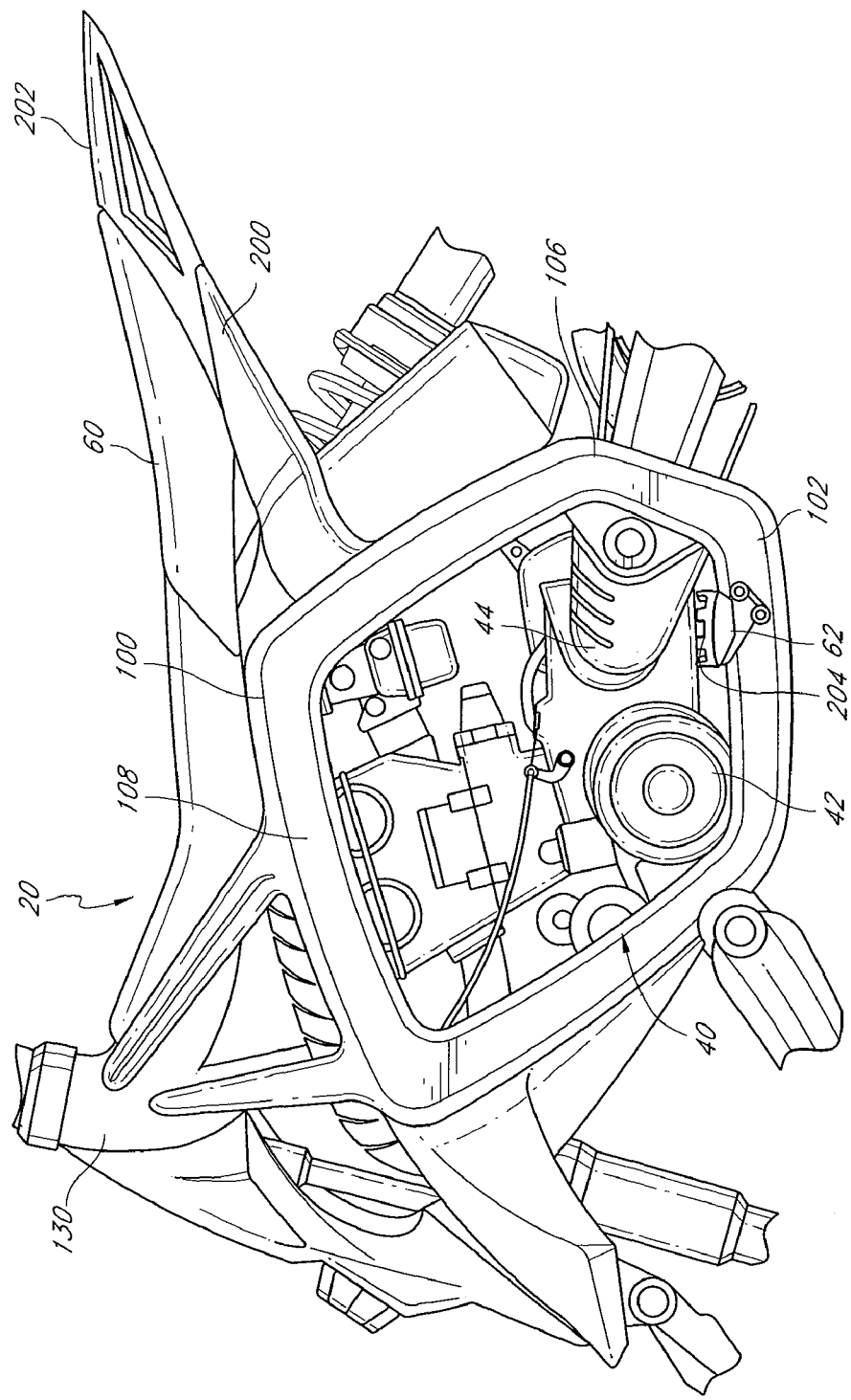
FIG. 8 is an enlarged side elevational view of a seat and foot pegs coupled to the vehicle body frame of the personal snow vehicle of FIG. 1.

As shown in FIG. 8, a seat 60 and foot pegs 62 are disposed on a central portion of the personal snow vehicle 10 for allowing a rider to straddle the vehicle 10 and operate the snow vehicle 10 in a comfortable manner. The seat 60 is connected to an upper portion of the vehicle body frame 20. A front portion of the seat 60 preferably is disposed above and substantially near the intersection of the rear member 106 and upper member 108 of the engine cage 100. The seat 60 can extend rearward and at least partially upward so as to provide sufficient support for a rider in a straddle-type position during operation of the snow vehicle 10. In one embodiment, the seat 60 is disposed at least partially above the engine 42. A tail section 200 extends from the rear member 106 of the engine cage 100 and is coupled to a rear portion of the seat 60 and includes a rear fender portion 202, which extends at least partially over the track 76. The tail section 200 provides additional support to the seat 60.

Foot pegs 62 are positioned on the left side and the right side of the snow vehicle 10. In one embodiment of the present snow vehicle, the foot pegs 62 are attached to the engine cage 100. The foot pegs 62 are preferably attached to the lower member 102 of the engine cage 100 substantially near the engine 42 and the transmission 44 of the power train 40. The foot pegs 62 can include grooves 204 disposed on an upper portion of each of the foot pegs 62. The grooves 204 provide a structure (e.g., square or triangular teeth) that is adapted to engage with a rider's shoe or boot so that a rider's feet maintain placement on the foot pegs 62 during operation of the personal snow vehicle 10.

The personal snow vehicle 10 can be equipped with comfort heat exchangers that provide heat to various portions of a rider's body during operation of the vehicle 10. Comfort heat exchangers are particularly useful for personal snow vehicles because such vehicles are typically operated in cold-weather environments where ice and snow is prevalent (i.e., at or below freezing temperature). The comfort heat exchangers can be positioned in a variety of locations and are not limited to the specific locations disclosed herein.

Comfort heat exchangers, for example, can be disposed substantially near the foot pegs 62 providing heat to keep a rider's feet warm. In this embodiment, the comfort heat exchangers 63 comprise exhaust passages that discharge heated exhaust air from the engine 42 to the outside of the vehicle 10. As heated exhaust air travels through the exhaust passage, heat is transmitted through the exhaust passage and ambient air by conduction, convection, and/or thermal radiation to the rider's feet. Similar exhaust-type heat exchangers 65 can be placed substantially near a bottom portion of the seat 60 so as to provide heat to the mid-section of a rider of the vehicle 10 when operating the vehicle 10 in a seated straddle-type position. A variation of this embodiment can include a heat exchanger disposed within the seat 60 which transmits heated engine coolant rather than heated exhaust air. In other embodiments, comfort heat exchangers 67 can be located substantially near, or within, the handlebars 38 of the steering assembly 34 (as shown in FIG. 5) so as to provide heat to a rider's hands during operation of the snow vehicle 10.

Figure 9:
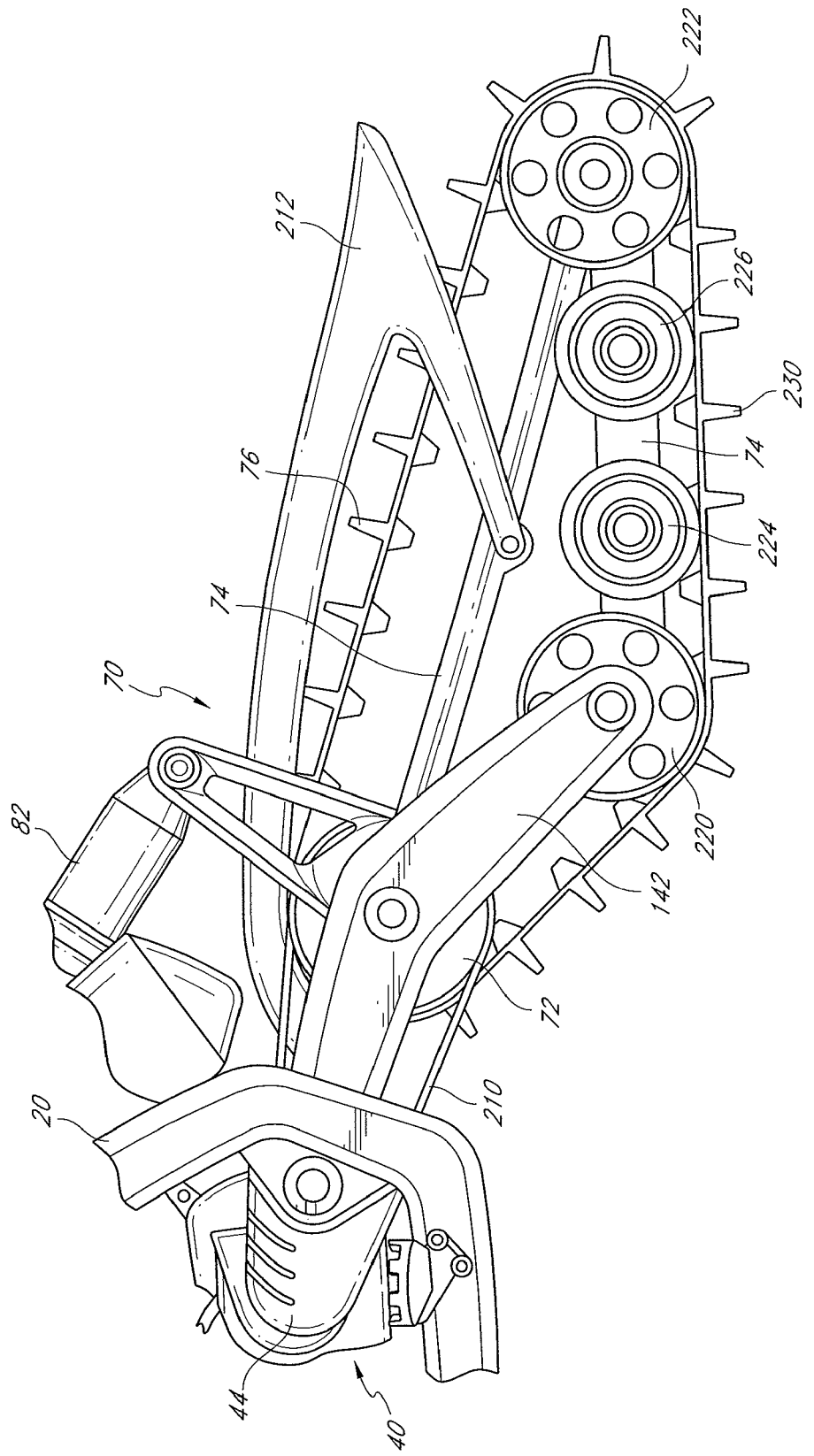
FIG. 9 is an enlarged side elevational view of a track drive mechanism of the personal snow vehicle of FIG. 1.

With reference to FIG. 9, one arrangement of a drive mechanism 70 of the snow vehicle 10 is described. The drive mechanism 70 generally comprises a drive wheel 72, a drive belt 210, a track arm assembly 74, a removable track 76, a series of support wheels, or idler wheels, are disposed within the track arm assembly 74, a series of connecting members coupling the components of the drive mechanism 70, and a track cover 212.

The drive wheel 72 is coupled to the transmission 44 of the power train 40 via the drive belt 210. The transmission 44 selectively transmits mechanical power produced by the engine 42 to the drive belt 210 and the drive wheel 72 so as to provide forward (and, optionally, rearward) translation of the personal snow vehicle 10. The drive belt 210 engages the transmission 44 at one end and engages the drive wheel 72 at the other end. The drive wheel 72 is preferably rearward of the transmission 44. The drive belt 210 rotates the drive wheel 72 about a central axis that is in a generally horizontal position in the lateral direction of the vehicle 10. The drive wheel 72 is also connected to the track arm assembly 74 and provides for rotation of the track 76.

The track arm assembly 74 defines a generally triangular configuration and is disposed about the drive wheel 72, a front main idler wheel 220, and a rear main idler wheel 222. In one embodiment, the drive wheel 72 is disposed in front of the front main idler wheel 220 and the front main idler wheel 220 is disposed in front of the rear main idler wheel 222. The drive wheel 72 is preferably disposed in a vertically higher position relative to the vehicle 10 such that the track arm assembly 74 generally defines an obtuse triangle. A front subsidiary idler wheel 224 and a rear subsidiary idler wheel 226 can also be disposed within the track arm assembly 74. The subsidiary idler wheels 224, 226 are preferably disposed between the main idler wheels 220, 222 and provide additional support to enable the track 76 to rotate about the drive wheel 72 and the main idler wheels 220, 222. Although idler wheels are preferred, other suitable arrangements for supporting the track 76 may also be used.

The removable track 76 is removably attached to the track arm assembly 74 and rotates along with the track arm assembly 74. The removable track 76 has a series of ridges 230 located along the removable track 76 that contact the ground when the vehicle 10 is operated providing enhanced traction under snow-packed and ice-packed conditions. Preferably, the removable track 76 can attach to and detach from the track arm assembly 74 with relative ease. In one embodiment, the drive mechanism 70 includes a removable or movable frame, such as by having removable arms to gain unobstructed access to the track 76, so as to expose one side of the removable track 76. In another embodiment, the track 76 can have an eyelet connection between portions of the track so that removal or attachment can be easily performed by simply disengaging or engaging the eyelet components. In another embodiment, the track 76 can comprise a split track with alligator clips that permits facilitating in quick and easy removal of the track 76 from the track arm assembly 74.

The components of the drive mechanism 70 are interconnected by a series of connecting members. A track cover 212 is coupled to the series of connecting members and is generally disposed above the track arm assembly 74 and the removable track 76. The track cover 212 is designed to prevent objects and debris from above a rear portion 14 of the vehicle 10 from entering and interfering with the drive mechanism 70 and also deflect objects thrown by the track 76. Similar to the vehicle body frame 20, as described above in connection with FIG. 2, the track cover 212 can be composed of a variety of materials. For example, in one embodiment, the track cover 212 is composed of a plastic resin material. A plastic resin material is advantageous because it is lightweight and provides sufficient strength and durability so as to withstand typical forces and impacts experienced during operation of the personal snow vehicle. In other embodiments, the track cover 212 is constructed of a metal alloy, such as a steel alloy, an aluminum alloy, a titanium alloy, or any combination thereof, or any other suitable material.

In some arrangements, as described above, the personal snow vehicle 10 may incorporate a one-way clutch (e.g., a Sprag clutch) within a transmission mechanism that operates between the engine 42 and a drive wheel 72 of the track drive mechanism 70. For example, the one-way clutch (not shown) can operate between a driven sprocket next to the drive wheel 72 and the axle of the drive wheel 72. In this manner, the drive wheel 72 can rotate faster than it would be otherwise driven by the engine 42 when landing from a jump. In other embodiments, however, the ability to free-wheel can be selectively permitted by a controller on the vehicle to maintain engine braking. For example, the controller can activate the one-way clutch only during those operating conditions when no load is sensed on the engine.

As shown in FIG. 9, one arrangement of the rear suspension 24 includes a swingarm 142, which is rotatably supported by the body frame 20. The illustrated swingarm 142 has arm portions extending along both sides of the drive mechanism 70. However, in other arrangements, the swingarm 142 may be located on only one side of the drive mechanism 70 to permit the track 76 to be easily removed from the opposite side. A shock absorber 82 is operably coupled between the swingarm 142 and the body frame 20 to attenuate movement of the swingarm 142 relative to the body frame 20.

The swingarm 142 rotatably supports the drive wheel 72 at an intermediate location of the swingarm 142 and rotatably supports the front main idler wheel 220 at a rear end portion of the swingarm 142. The track arm assembly 74 functions as a track support and, as described above, is carried by the swingarm 142. The drive wheel 72, front main idler wheel 220, rear main idler wheel 222 and the subsidiary idler wheels 224, 226 are supported by the track arm assembly 74, which in the illustrated arrangement is constructed of multiple arms or linkage members. With this arrangement, the drive track 76 moves in an arcuate path relative to the body frame 20 throughout the suspension travel of the rear suspension 24. In such a rear suspension system 24, an angle of the bottom surface of the track 76 changes relative to the body frame 20 throughout the rear suspension travel rather than being parallel at different points throughout the suspension travel. However, the illustrated rear suspension 24 has relatively few moving parts for lower cost and reduced weight.

In some arrangements, however, it is preferable for the bottom surface of the track 76 to be generally parallel at different points throughout the suspension travel. In a preferred embodiment, the bottom surface of the track 76 is maintained generally horizontal throughout the suspension travel. As shown in FIGS. 10A through 10F, the personal snow vehicle 10 includes a rear suspension 24 having a parallel linkage system 80 and a rear shock 82. The rear shock 82 is shown in FIG. 10E. The rear suspension 24 is coupled to the drive mechanism 70 and is adapted to absorb forces applied to the removable track 76 during operation of the snow vehicle 10.

The parallel linkage system 80 comprises a swingarm assembly 300 disposed in a rear portion 14 of the vehicle 10 and an attachment mechanism 302 connecting the swingarm assembly 300 to the vehicle body frame 20. The swingarm assembly 300 can include a lower swingarm 304, an upper swingarm 306, and a series of linkage members 308. The lower swingarm 304 is coupled to a lower portion 314 of the attachment mechanism 302, while the upper swingarm 306 is likewise coupled to an upper portion 316 of the attachment mechanism 302. The lower swingarm 304 and the upper swingarm 306 extend rearward from the attachment mechanism 302 and, through a variety of linkage members 308, are connected to various components of the drive mechanism 70.

In particular, the lower swingarm 304 is configured to rotate and pivot about a lower axis 310 that is generally horizontal and configured in the lateral direction of the vehicle 10. The lower axis 310 is positioned on the lower portion 314 of the attachment mechanism 302. The lower swingarm 304 is preferably coupled to the drive wheel 72. Consequently, when the lower swingarm 304 rotates about the lower axis 310, the drive wheel 72 also rotates in an arcuate path with respect to the attachment mechanism 302 of the snow vehicle 10. Similarly, the upper swingarm 306 is configured to rotate about an upper axis 312 that lies generally parallel to the lower axis 310 and is positioned on the upper portion 316 of the attachment mechanism 302.

A rear linkage or track support 318, which is comprised of framework linkage members 308, couples the drive wheel 72, front main idler wheel 220, rear main idler wheel 222 and the subsidiary idler wheels 224, 226. The track support 318 is rotatably coupled to rearward end portions of the lower swingarm 304 and upper swingarm 306 to be carried by the lower swingarm 304 and upper swingarm 306. The rotational coupling of the rearward end of the upper swingarm 306 to the track support 318 can define a "first axis" and the rotational coupling of the rearward end of the lower swingarm 304 to the track support 318 can define a "second axis". The upper swingarm 306 can be connected to the track support 318 at a position generally above a center portion of the removable track 76 by a linkage bracket 320 (which can define a first axis about which the track support 318 rotates). The rearward end portion of the lower swingarm 304 is connected to the track support 318 at the wheel 72 so as to allow the track support 318 to rotate about the central axis of the wheel 72, which, as noted above, can serve as a "second axis". As a result, the upper swingarm 306 rotates about the upper axis 312 when the lower swingarm 304 rotates and pivots about the lower axis 310. In the illustrated arrangement, the connection axis between the upper swingarm 306 and the track support 318 is located outside of an area bounded by the track 76 from a side view of the personal snow vehicle 10.

Figure 10A:
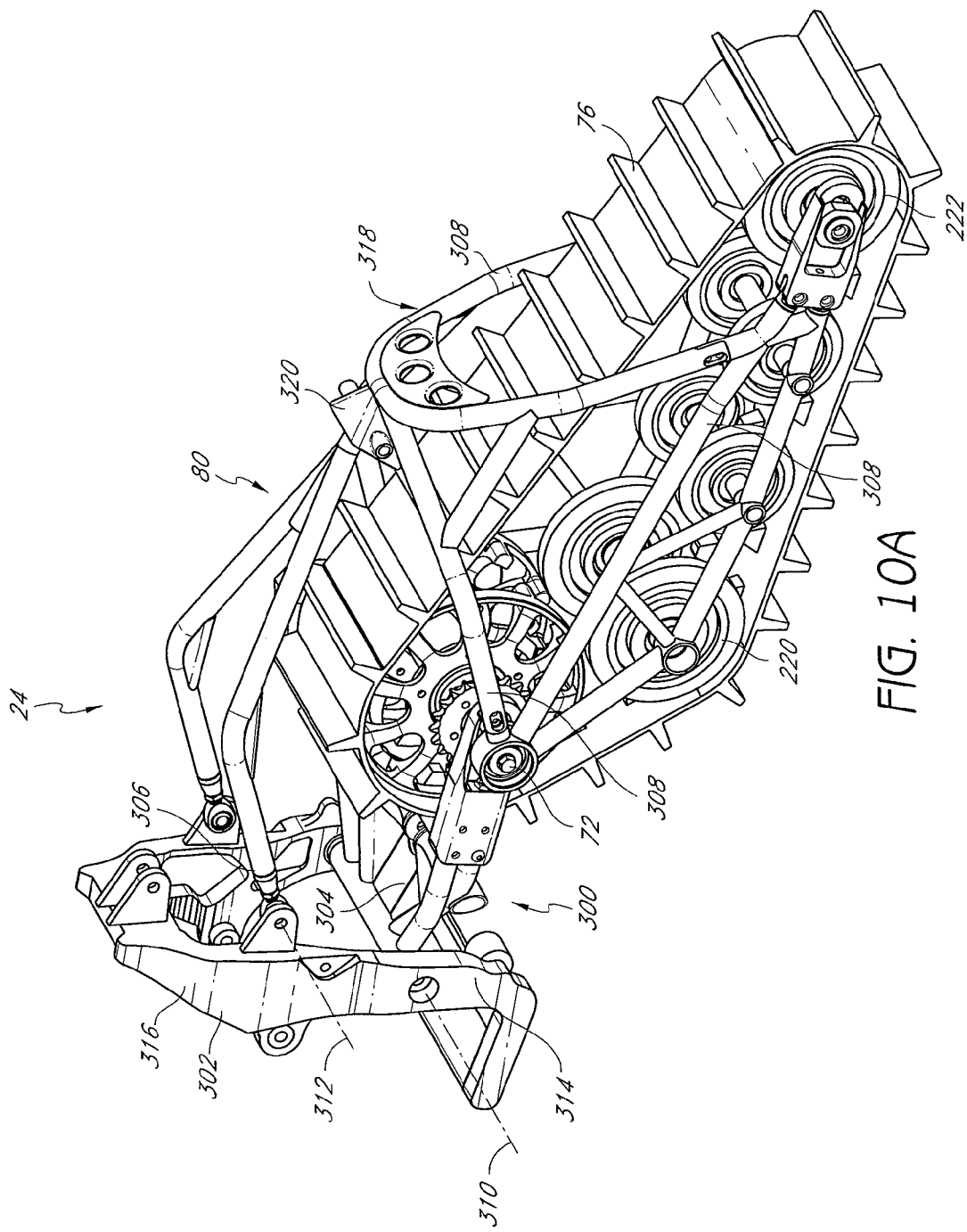
FIG. 10A is a perspective view of a rear suspension of the personal snow vehicle of FIG. 1.
Figure 10B:
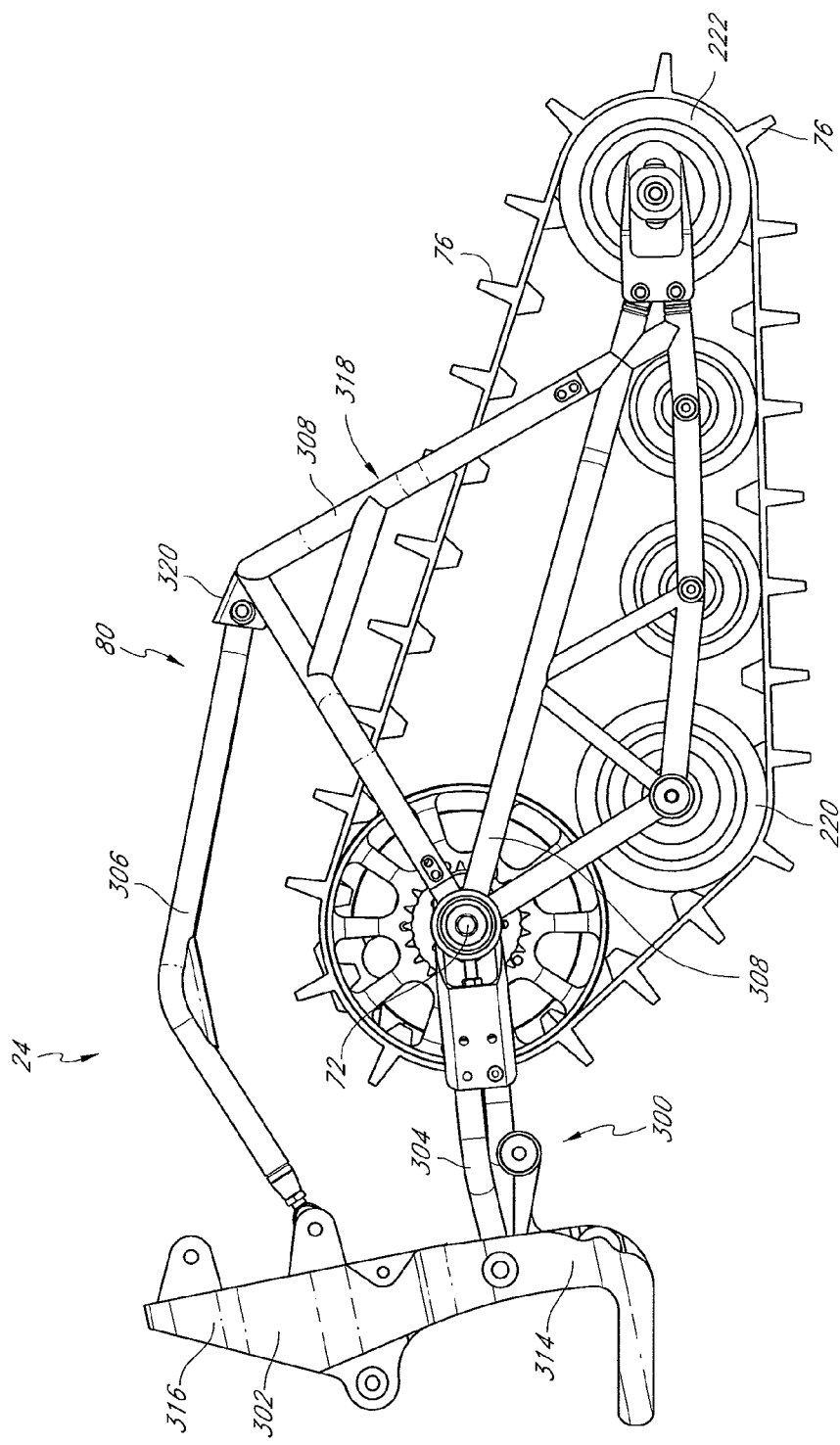
FIG. 10B is a side elevational view of the rear suspension of FIG. 10A.
Figure 10C:
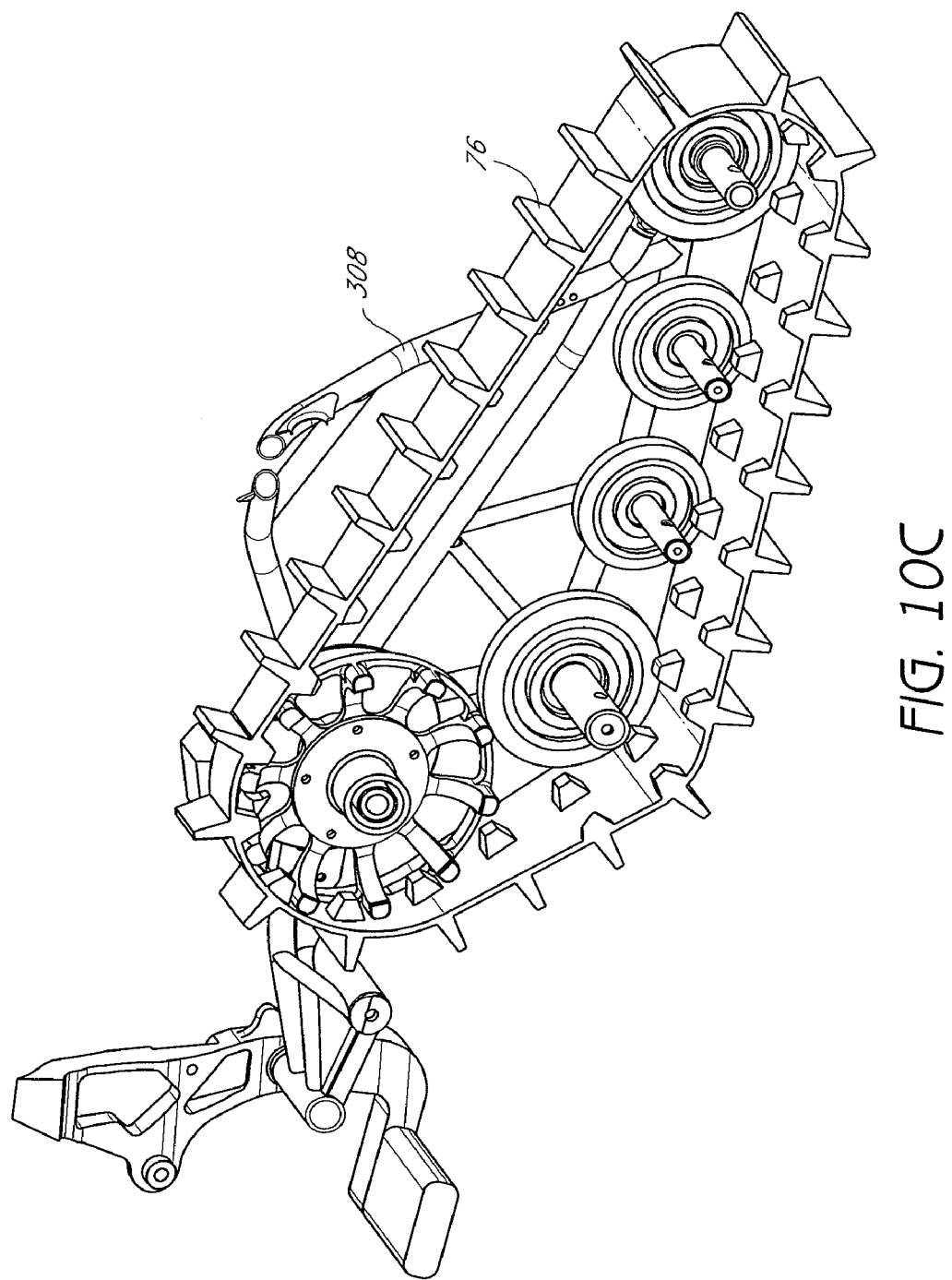
FIG. 10C is a cross-sectional perspective view of the rear suspension of FIG. 10A.
Figure 10D:
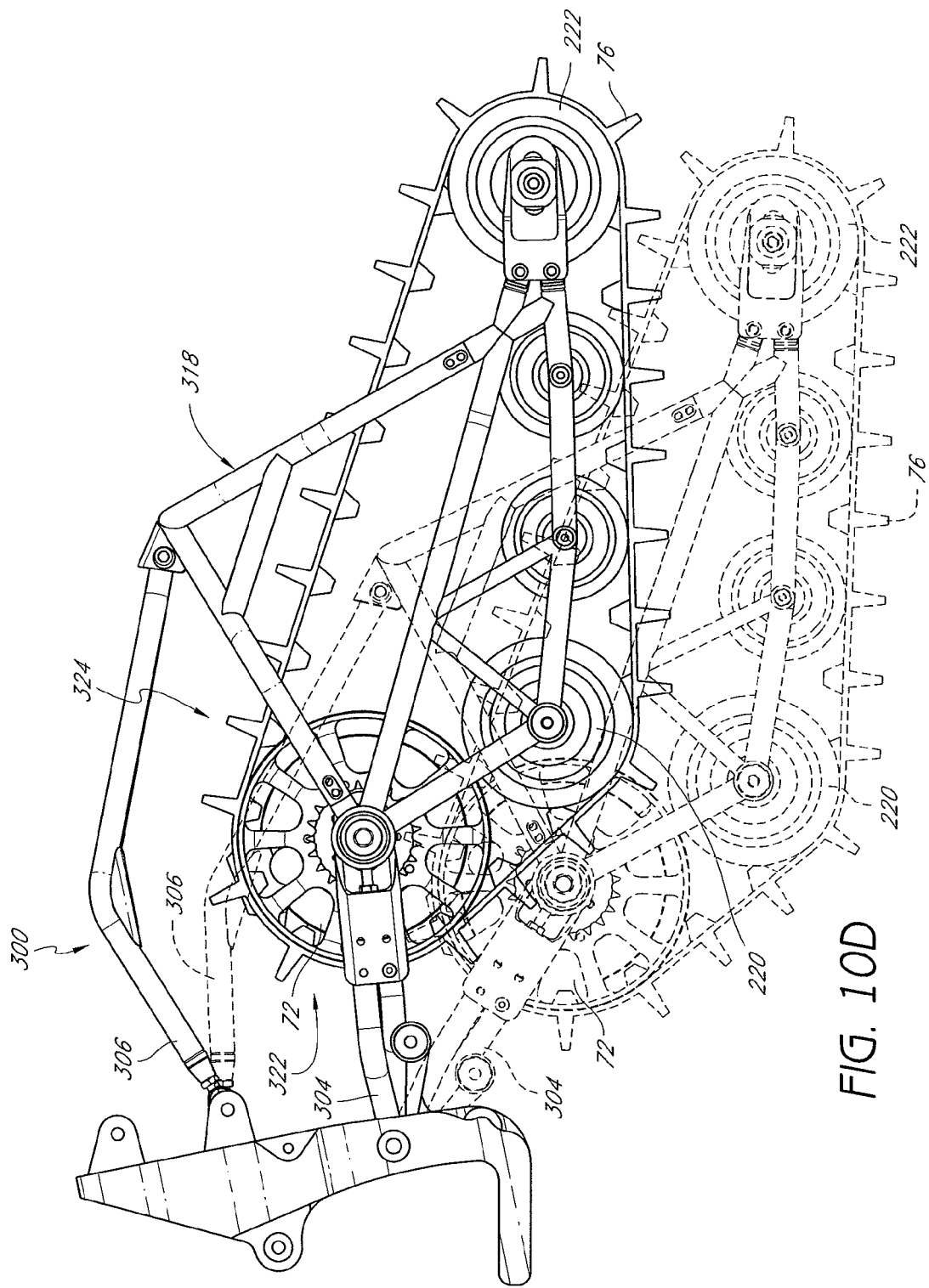
FIG. 10D is a side elevational view of the rear suspension of FIG. 10A showing the rear suspension in a first position, which is shown in phantom lines, and a second position, which is shown in normal lines.
Figure 10E:
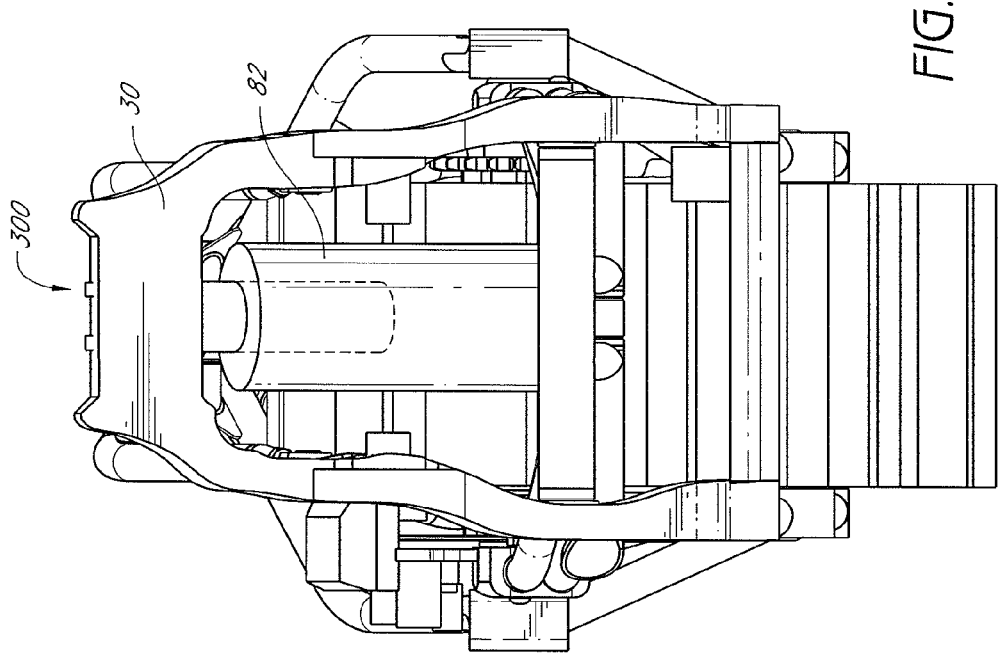
FIG. 10E is a front elevational view of the rear suspension of FIG. 10A.
Figure 10F:
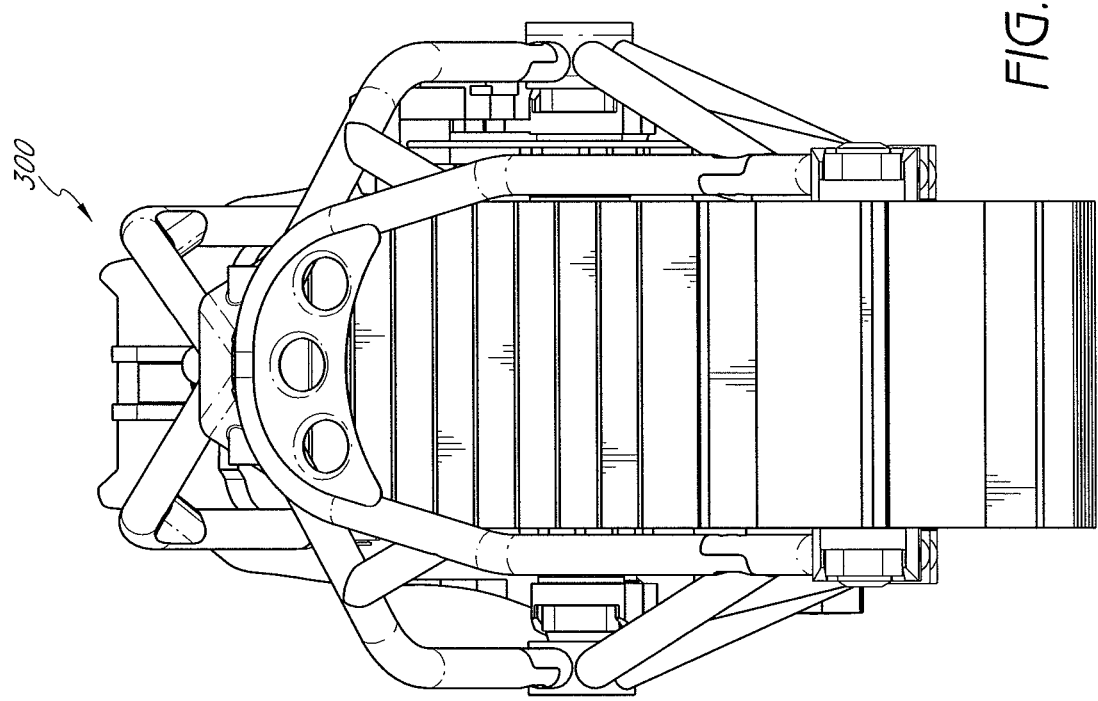
FIG. 10F is a rear elevational view of the rear suspension of FIG. 10A.

As shown in FIG. 10D, a portion of the upper swingarm 306 and the lower swingarm 304 define a first parallelogram 322 when the swingarm assembly 300 is disposed in a first position, which is shown in phantom lines. As a force is applied to the removable track 76 of the snow vehicle 10, the swingarm assembly 300 permits the removable track 76 to displace in a vertical direction relative to the vehicle 10. Consequently, a portion of the upper swingarm 306 and the lower swingarm 304 will define a second parallelogram 324 when the swingarm assembly 300 is disposed in a second position, which is shown in normal lines. The linkage members 308 change position relative to each other when the swingarm assembly 300 translates from a first position to a second position such that the second parallelogram 324 is different from the first parallelogram 322. As a result, the components of the drive mechanism 70, such as the removable track 76, the drive wheel 72, and the main idler wheels 220, 222, remain in a parallel configuration even when the removable track 76 is displaced in vertical direction.

This system described above is referred to as a parallel linkage system. Advantageously, a parallel linkage system normally maintains the track 76 parallel to the ground during operation of the personal snow vehicle 10. This is particularly useful in allowing the track 76 to move back and forth relative to the front suspension 22 of the snow vehicle 10 so as to soften the impact when the vehicle 10 elevates from the ground and lands on the track 76. Due to the parallel linkage system, the present snow vehicle 10 can be used for a wide variety of applications and under a wide variety of conditions, such as for transporting a rider over a rough and bumpy terrain for a relatively long distance.

As shown in FIG. 8E, the rear suspension 24 can also include a rear shock 82 that is connected to a front portion of the swingarm assembly 300 substantially near the attachment mechanism 302. The rear shock 82 coupled to the vehicle body frame 20 at its upper end and is designed to absorb the forces and impacts experienced in the rear suspension 24 of the snow vehicle 10.

Figure 10G:
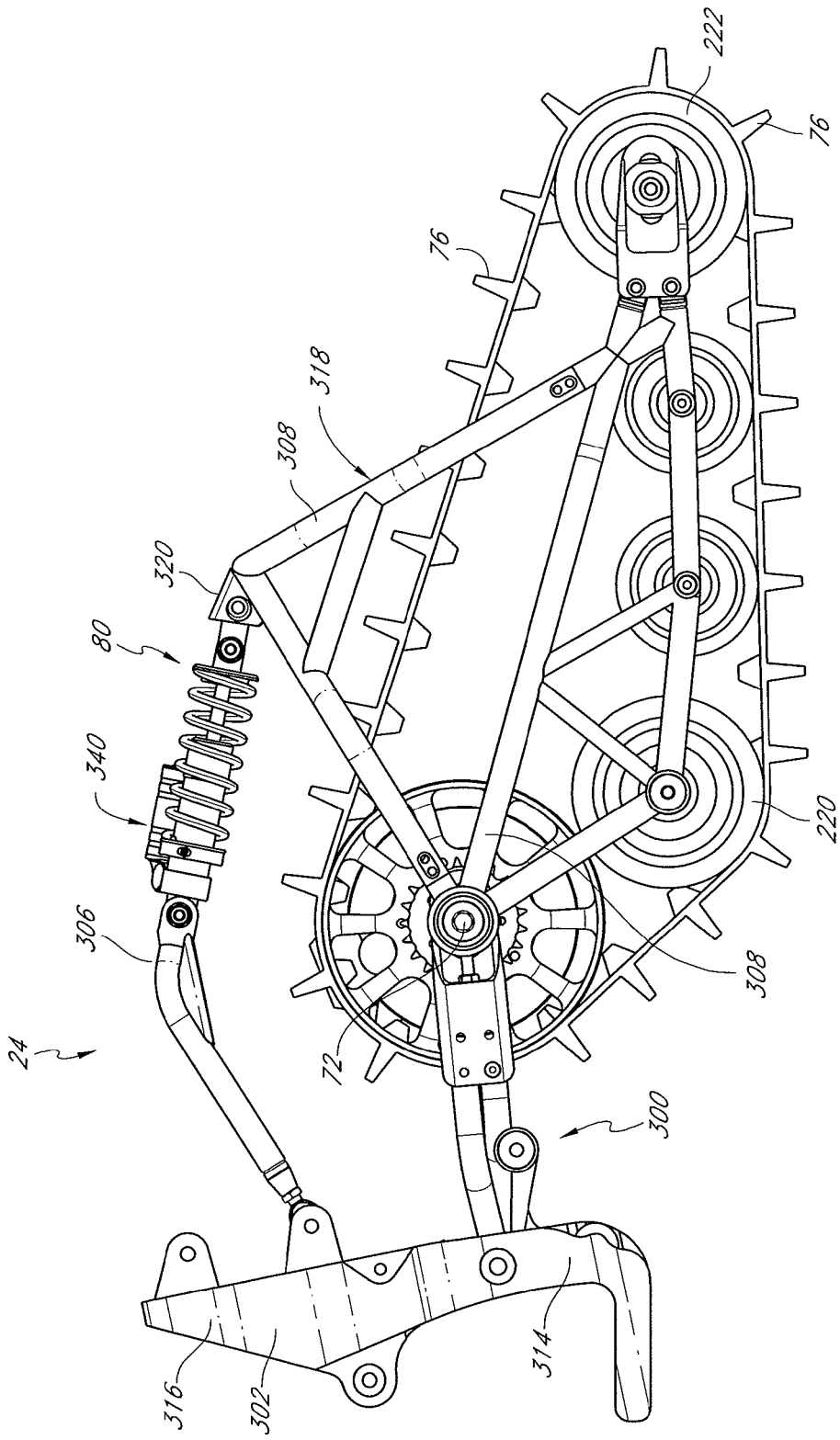
FIG. 10G is a side elevational view of a modification of the rear suspension of FIGS. 10A-10F. The rear suspension of FIG. 10G includes a compliant upper linkage member, or upper swingarm.
Figure 10H:
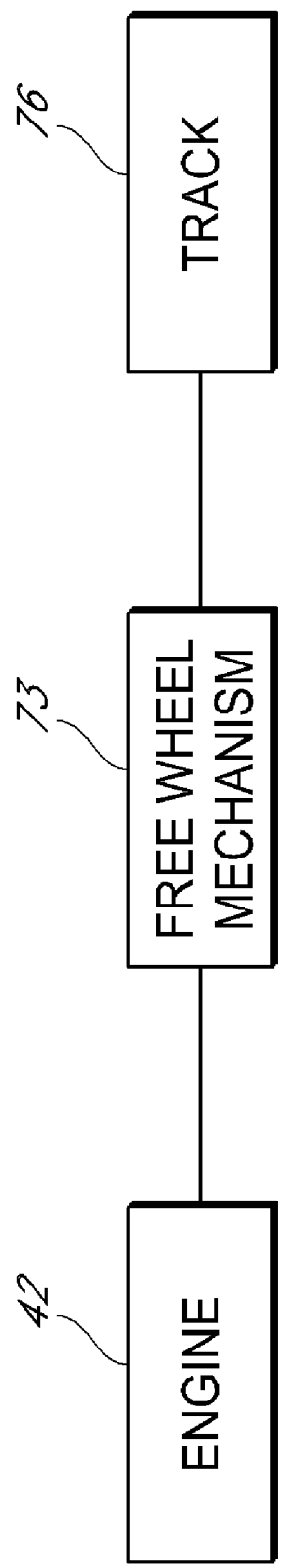
FIG. 10H is a schematic diagram showing a freewheel mechanism operably positioned between the engine and the removable track.

With reference to FIG. 10G, in one arrangement, one or more linkage members (e.g., lower swingarm 304, upper swingarm 306 or linkage members 308) of the rear suspension 24 may be compliant. That is, one or more of the linkage members may be capable of variations in the distance between the first and second ends of the linkage member. In the illustrated arrangement, a shock absorber 340 is incorporated within the upper swingarm 306. The shock absorber 340 permits the length of the upper swingarm 306 to vary to adjust a tilt angle of the track support 318. Thus, the compliant upper swingarm 306 permits the track 76 to tilt from its normal position at one or more points throughout the suspension travel of the rear suspension 24. For example, while it may preferably in most circumstances for the lower surface of the track 76 to maintain a generally horizontal orientation throughout the rear suspension travel, in certain circumstances, such as landing from a jump, it may be desirable for a tilt angle of the track 76 to vary at least for a period of time in order to better absorb the impact force. The shock absorber 340 may permit the upper swingarm 306 to both shorten and lengthen relative to a neutral position or, alternatively, may be compliant in only one direction from a neutral position. The compliant upper swingarm 306 may be provided in addition to the shock absorber 82 (not shown in FIG. 10G) that controls movement of the swingarm assembly 300 relative to the body frame 20.

Figure 11:
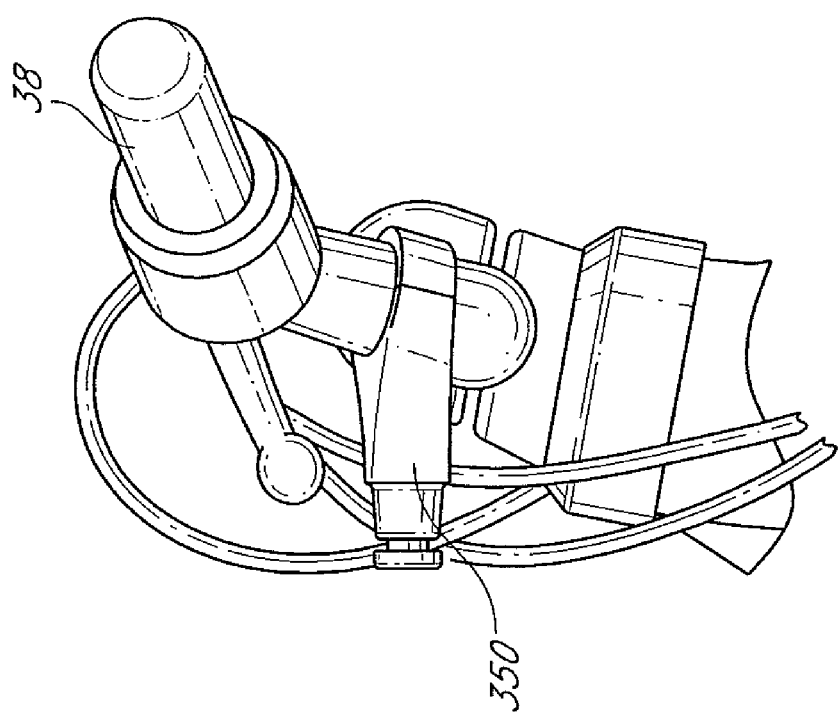
FIG. 11 is an enlarged side elevational view of a personal snow vehicle having at least one camera mount on the handlebars of the steering assembly of the personal snow vehicle of FIG. 1.

With reference to FIG. 11, at least one camera mount 350 can be mounted to a portion of the snow vehicle 10. In one embodiment, as shown in FIG. 11, the at least one camera mount 350 is mounted to the handlebars 38. Preferably, the at least one camera mount 350 is relatively compact so as to not impede operation of the snow vehicle 10. A camera (not shown) may be removable from the mount 350 that remains attached to the handlebars 38 such that the camera may be easily removed and reattached to the handlebars 38.

Figure 12A:
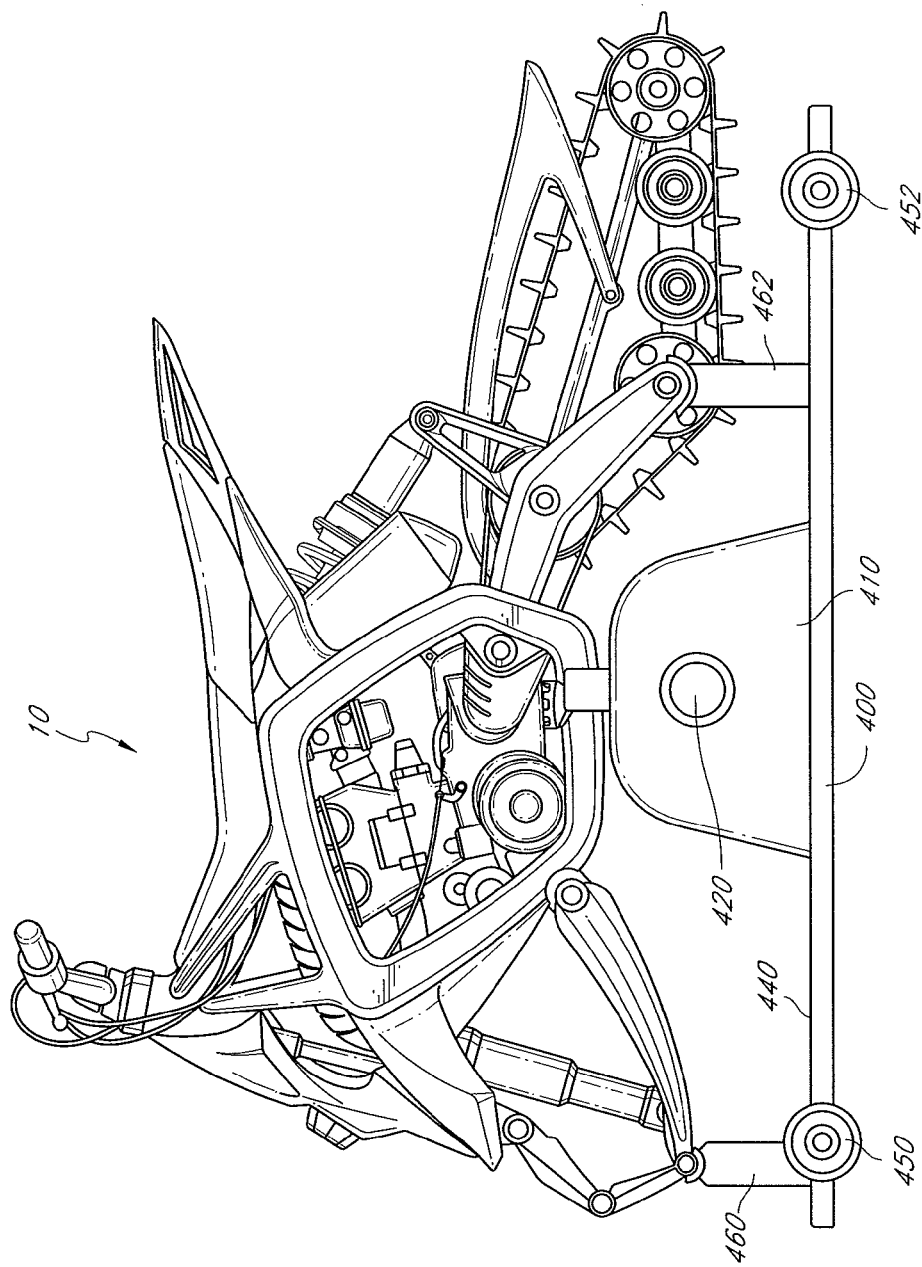
FIG. 12A is a side elevational view of one embodiment of a transportation dolly that can be used to transport the personal snow vehicle of FIG. 1.
Figure 12B:
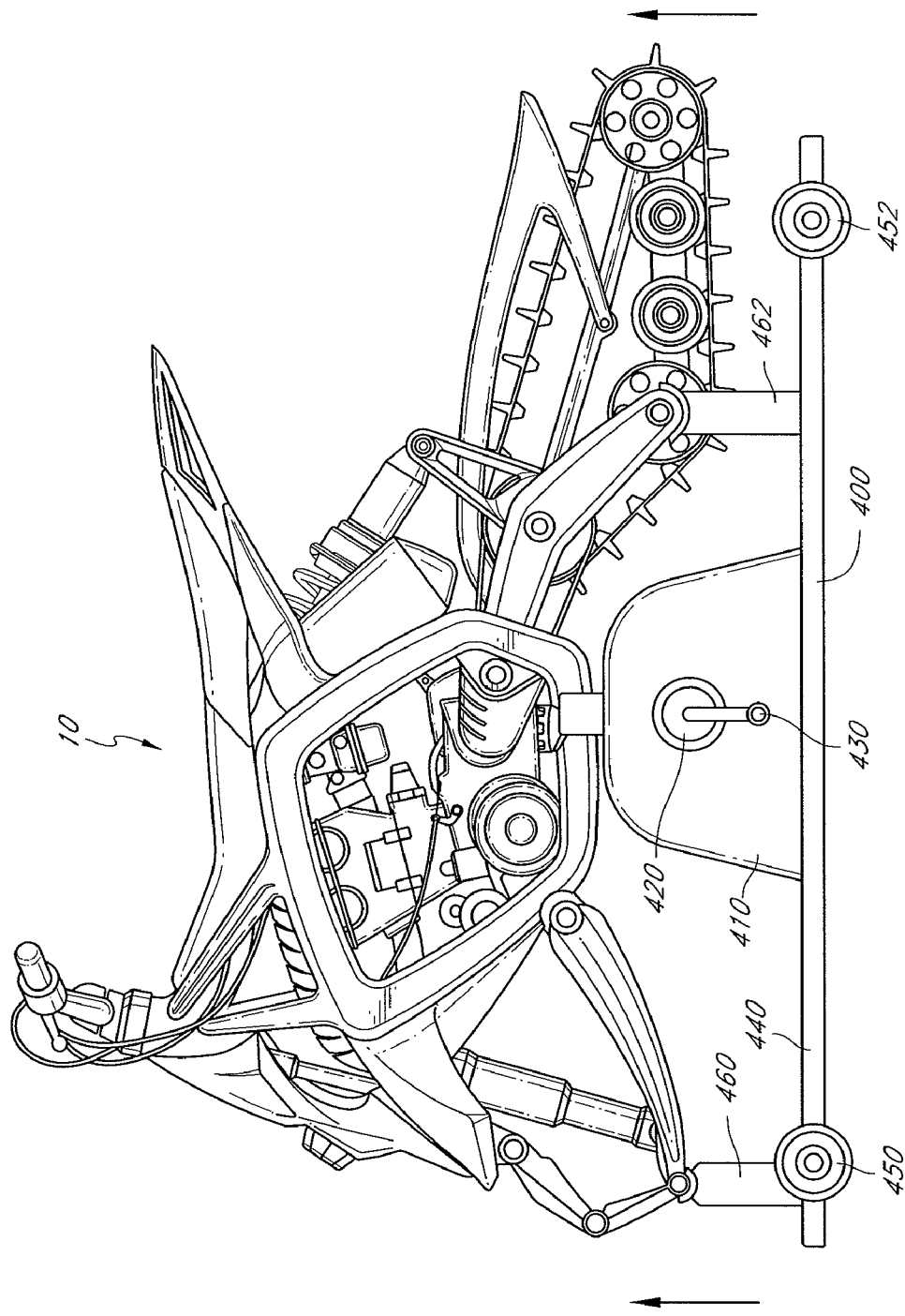
FIG. 12B is a side elevational view of another embodiment of a transportation dolly that can be used to transport the personal snow vehicle of FIG. 1.

As shown in FIGS. 12A and 12B, a transportation dolly 400 can be used to transport the personal snow vehicle 10. The dolly 400 includes a frame or platform 440 onto which the snow vehicle 10 can be loaded. The dolly 400 also includes a plurality of wheels, which support the platform 440. The plurality of wheels can include, for example, one or more front wheels 450 and one or more rear wheels 452. In one embodiment, the front wheel(s) 450 and the rear wheel(s) 452 can swivel relative to the platform 440. Preferably, the front wheel(s) 450 and the rear wheel(s) 452 can be locked when desired, such as when loading the snow vehicle 10 onto the platform 440. The platform 440 can also include one or more tie downs or attachment bosses to which a portion the snow vehicle 10 can be attached (e.g., the lower end of the front suspension 22 after the at least one ski 30 has been removed as described above). The platform 440 can include a front attachment boss 460, which can be used to releasably attach the front suspension 22 to the dolly 400. The platform can also include a rear attachment boss or other engaging structure 462, which can attach the rear suspension 22 to the dolly 400. The front attachment boss 460 and the rear attachment boss 462 operate so as to securely connect the snow vehicle 10 to the platform 440 of the transportation dolly 400 during transportation of the snow vehicle 10.

In one embodiment, the vehicle 10 is secured to the front attachment boss 460 and the rear attachment boss 462 through pin connections in which pins can be positioned through the front attachment boss 460 and the rear attachment boss 462 and can lock into place so as to secure the snow vehicle 10 to the transportation dolly 400. In another embodiment, the snow vehicle 10 can be secured to the dolly 400 through at least one tie down strap. At one end, the at least one tie down strap is coupled to the platform 440 of the dolly 400. The other end of the tie down strap can be positioned at least partially through a portion of the vehicle 10, such as through the rear drive mechanism 70, and can securely attach to a portion of the platform 440 of the dolly 400.

In some embodiments, the dolly 400 cooperates with a trailer to ease loading of the snow vehicle 10 onto the trailer. In some embodiments, the dolly 400 cooperates with a conventional hitch receiver on the back of a truck or automobile. In a more preferred embodiment, the dolly 400 includes an integral lift mechanism 420 (e.g., a ball-screw device) that permits a hitch mechanism 410 (e.g., a hitch tongue) on the dolly 400 to engage the hitch receiver with the dolly platform 440 supported on the front and rear wheels 450, 452. The lift mechanism 420 can then be operated (e.g., via a crank) to raise the dolly platform 440 relative to the hitch mechanism 410 and lift it off the ground for transportation.

More particularly, with reference to FIG. 12A, a hitch mechanism 410 can be mounted to a trailer towing receiver on the rear of a transporting vehicle, such as a typical car or truck. The dolly 400 can be lifted onto the hitch mechanism 410 and can lock in place on the hitch mechanism 410, thus securing the snow vehicle 10 for transportation. In another embodiment, as shown in FIG. 12B, the hitch mechanism 410 is equipped with a lift mechanism 420. In one embodiment, the lift mechanism 420 can be operated by a ball screw drive. Alternatively, the lift mechanism 420 can be hydraulically, cable, or scissor linkage operated. The actuation of the lift mechanism 420 can be operated manually with a rotating handle 430. In one embodiment, the operation of the lift mechanism 420 can be controlled with an electric motor, which can replace the rotating handle 430. In another embodiment, the operation of the lift mechanism 420 can be controlled through a combination of electric and manual operations.

A transportation system that includes the dolly 400 and the hitch mechanism 410 can also include additional framing or structure that interacts with the snow vehicle 10 to lock the vehicle 10 on the back of a truck or car without the use of straps or rope. For example, the structure can include one or more clips that snap onto a frame or other portions of the snow vehicle 10 to secure the snow vehicle 10 onto the back of the truck or car.

Figure 13A:
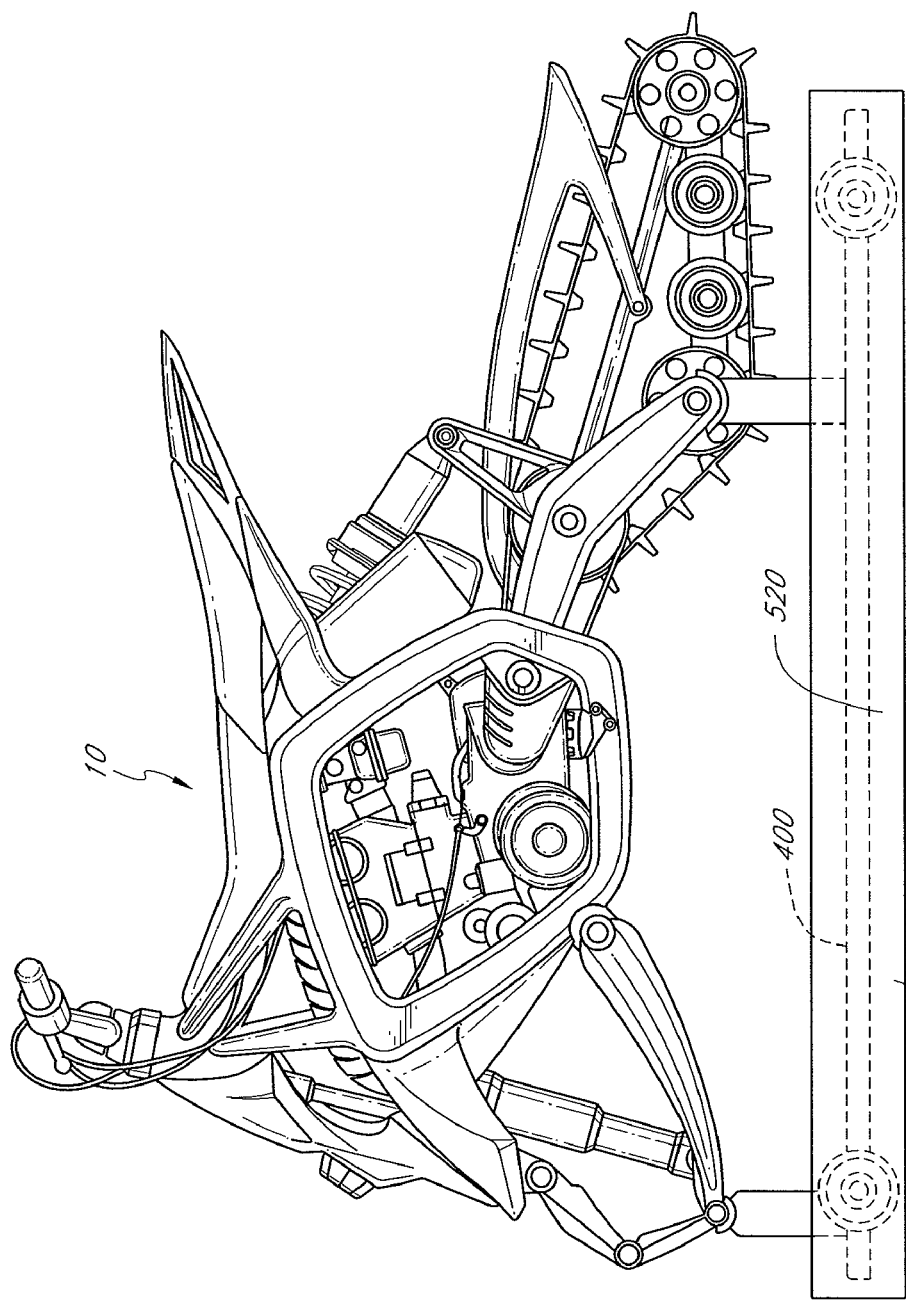
FIG. 13A is a side elevational view of a carrier that can be used in combination with a transportation dolly to transport the personal snow vehicle of FIG. 1.
Figure 13B:
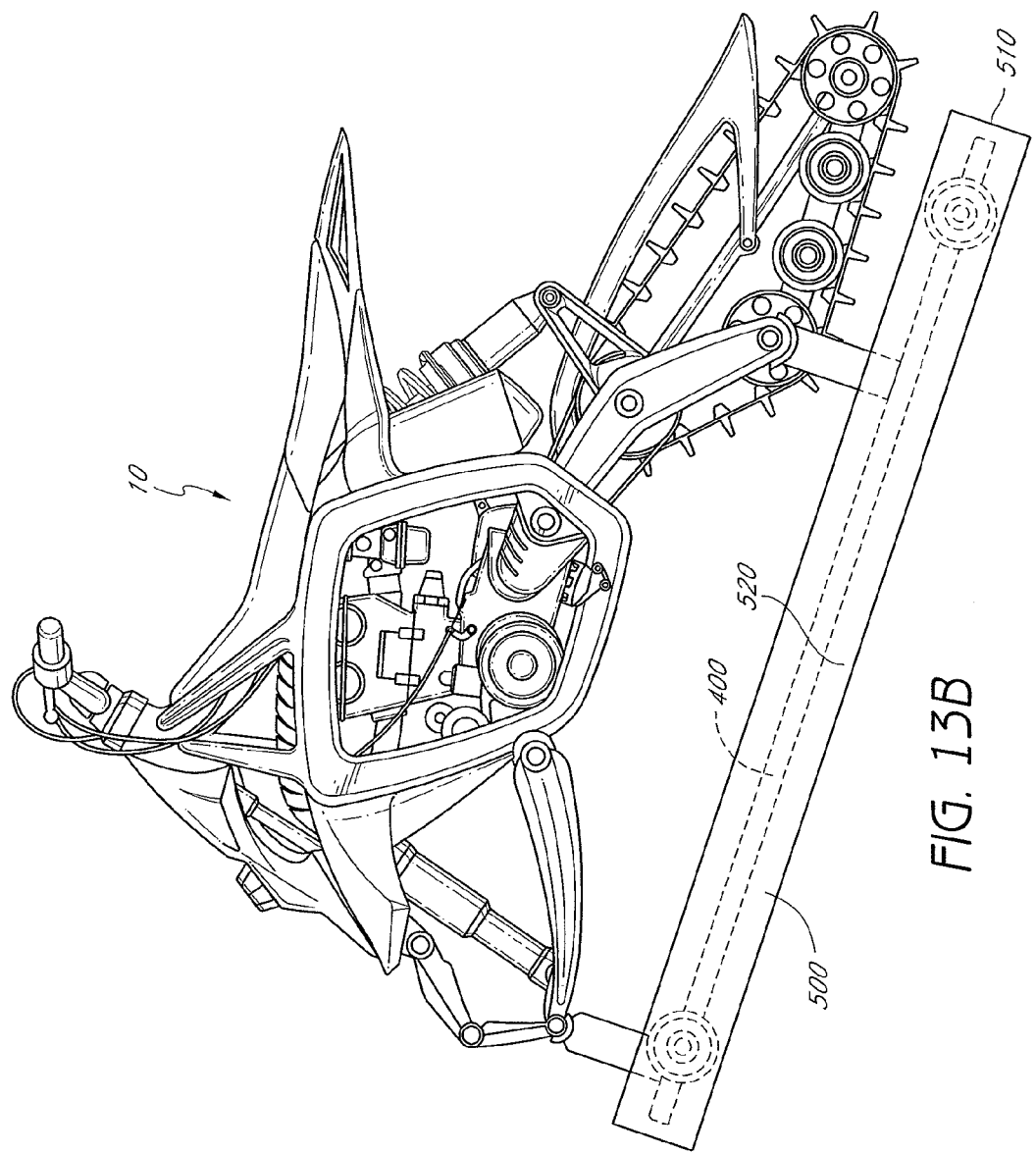
FIG. 13B is a side elevational view of the carrier of FIG. 13A in an inclined configuration.
Figure 13C:
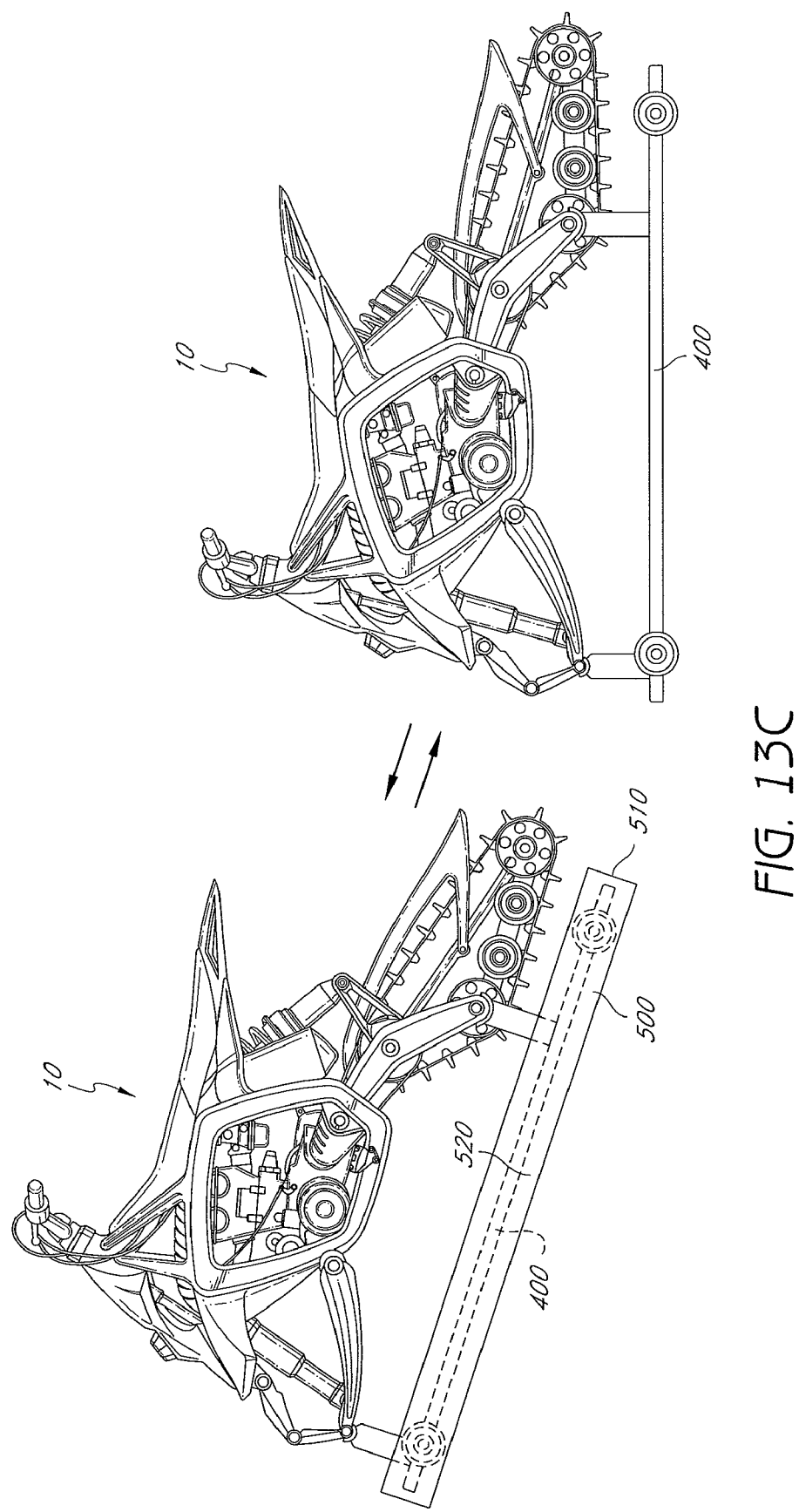
FIG. 13C is a side elevational view of the carrier of FIG. 13A illustrating that the transportation dolly can be loaded onto and unloaded from the carrier.

With reference now to FIGS. 13A through 13C, a carrier 500 can also be used in combination with the dolly 400 to transport the snow vehicle 10. Similar to the dolly 400 as described above, the carrier 500 can be mounted to a trailer towing receiver on the rear of a transporting vehicle, such as a typical car or truck. In one embodiment, during transportation of the personal snow vehicle 10, the vehicle 10 is secured in a generally horizontal position and the dolly 400 is secured to the carrier 500 using clamps. FIGS. 13B and 13C show the carrier 500 in an inclined position to allow for loading and unloading of the dolly 400. The carrier 500 can incline by using an exemplary tilt mechanism that is generally well known to a person of ordinary skill in the art.

A first end 510 of the carrier 500 can contact the ground, which allows the dolly 400 to roll at least partially vertically upward into the carrier so as to easily load the dolly 400 onto the carrier 500. Advantageously, inclining the carrier 500 in this manner allows the dolly 400 to be loaded onto and unloaded from the carrier 500 without the necessity of lifting the personal vehicle 10 and dolly 400 onto the carrier 500. The carrier 500 can include a fold-up ramp secured to the first end 510 of the carrier 500. The fold-up ramp can rotate about a pivot axis from a first position in which the ramp is generally down and the carrier 500 can receive a dolly 400 and snow vehicle 10 to a second position in which the ramp is generally up and prevents the dolly 400 and the snow vehicle 10 from leaving the platform 520 of the carrier 500.

In one embodiment, the carrier 500 has at least one depression in a platform 520 of the carrier 500. The at least one depression is positioned on the carrier platform 520 to receive at least one of the front wheel 450 and the rear wheel 452 of the transportation dolly 400. For example, in one embodiment, the at least one depression comprises a front depression and a rear depression. In another embodiment, the at least one depression is angled for permitting easier loading and unloading of the dolly 400.

In one embodiment, the carrier 500 includes a tie down structure that extends vertically upward from the platform of the carrier 500. The tie down structure has an upper bracket member at its upper end. The upper bracket member is configured attach to the upper portion 16 of the snow vehicle 10 to securely attach the vehicle 10 to the carrier 500. Advantageously, the tie down structure attaches to an upper portion 16 of the vehicle 10 to prevent the snow vehicle 10 from tipping over during transportation and enhances the overall stability of the vehicle 10 during transportation. This advantage is particularly important because the snow vehicle 10 is often subject to lateral forces on its upper portion 16 during transportation.

Figure 14:
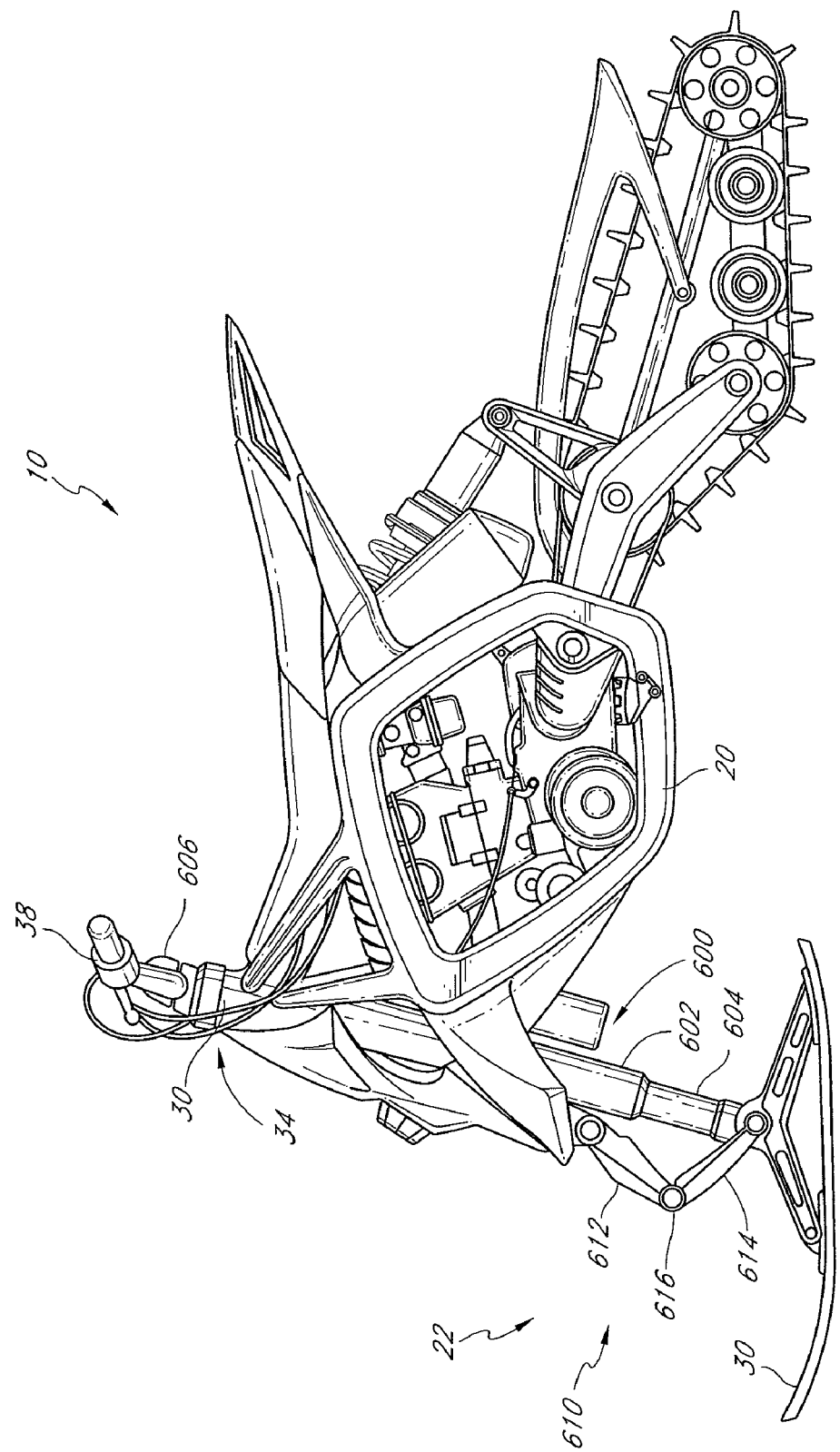
FIG. 14 is a side elevational view of a modification of the personal snow vehicle of FIG. 1. The personal snow vehicle of FIG. 14 includes a single tube front suspension arrangement, in which a single telescoping tube assembly couples the at least one ski to the vehicle body frame. An external pivot structure prevents relative rotation of the upper and lower tubes of the single telescoping tube assembly.
Figure 15:
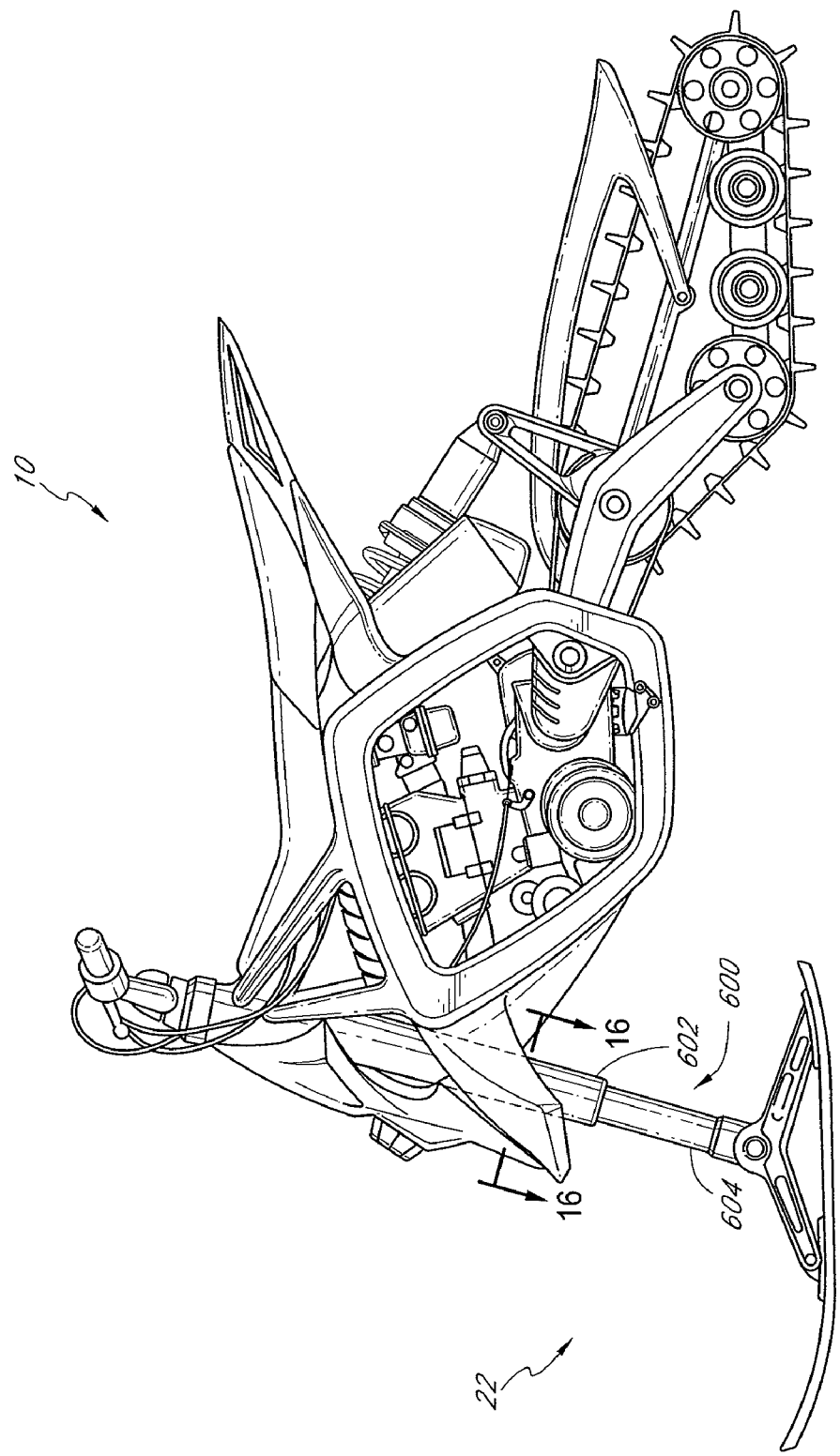
FIG. 15 is a side elevational view of another personal snow vehicle that includes a single tube front suspension arrangement. The personal snow vehicle of FIG. 15 includes an internal mechanism for preventing relative rotation of the upper and lower tubes of the single telescoping tube assembly.

FIGS. 14 and 15 illustrate modifications of the snow vehicle 10 shown and described in FIGS. 1-13 above. Many aspects of the snow vehicles 10 of FIGS. 14 and 15 are substantially similar to the snow vehicle 10 described above. Accordingly, the same reference numerals from the vehicles 10 of FIGS. 1-13 are used to identify the same or similar components in the vehicles of FIGS. 14 and 15.

The snow vehicle 10 of FIGS. 14 and 15 include a modifications of the front suspension 22 of the snow vehicle 10 described above with reference to FIGS. 1-13. In particular, the snow vehicles 10 of FIGS. 14 and 15 incorporate a single telescoping tube front suspension 22. The single telescoping tube front suspension 22 includes a single telescoping tube assembly 600 that includes an upper tube 602 that telescopically receives a lower tube 604. That is, the lower tube 604 is slidably received within the upper tube 602. In alternative arrangements, the upper tube 602 may be received within the lower tube 604. Preferably, the suspension tube assembly 600 is configured to produce both a spring force and a damping force in response to relative movement between the tubes 602 and 604. For example, the suspension tube assembly 600 may incorporate a spring (e.g., a coil spring or a gas spring) and a damper (e.g., a fluid damper) that cooperate with one another to provide a desired suspension force characteristic for the front suspension 22.

An upper end of the suspension tube assembly 600 is rotatably coupled to the handlebars 38. The lower end of the suspension tube assembly 600 is coupled to the ski 30, such that rotation of the handlebars 38 causes rotation of the ski 30. The lower end of the suspension tube assembly 600 may be coupled to the ski 30 through any suitable coupling arrangement. However, preferably the ski 30 is coupled to the suspension tube assembly 600 through an attachment mechanism that permits the ski 30 to be coupled and removed from the suspension tube assembly 600 without the use of tools, such as the attachment mechanism 154 described above with reference to FIG. 5.

The suspension tube assembly 600 may be coupled for rotation with the handlebars 38 through any suitable coupling arrangement. For example, the upper tube 602 of the suspension tube assembly 600 may be journaled for rotation within the head pipe 130 and may be coupled to the handlebars 38 by a handlebar clamp 606. With such an arrangement, the suspension tube assembly 600 is supported relative to the vehicle body frame 20 at an angle equal to the angle of the head tube 130 and is aligned with a central plane of the personal snow vehicle 10. In alternative arrangements, the suspension tube assembly 600 may be supported relative to the body frame 20 through an intermediate component or assembly. For example, a steering shaft (not shown) may be journaled for rotation within the head tube 130 and the suspension tube assembly 600 may be coupled to the steering shaft. In such an arrangement, the suspension tube assembly 600 may be coupled to the steering shaft such that the steering shaft and the suspension tube assembly 600 are coaxial. Alternatively, the suspension tube assembly 600 may be offset from the steering shaft. That is, the suspension tube assembly 600 may be offset from the steering shaft, such that the axes of the steering shaft and the suspension tube assembly 600 are offset but parallel to one another, or the axis of the suspension tube assembly 600 may be angled relative to the steering shaft. In such arrangements, the single suspension tube assembly 600 may be aligned with a central plane of the snow vehicle 10 or may be laterally offset from the central plane of the snow vehicle 10. A linkage mechanism, or other suitable arrangement, may be utilized to transmit rotational motion of the steering shaft to the suspension tube assembly 600.

The suspension tube assembly 600 may incorporate a mechanism for preventing relative rotation of the upper tube 602 and the lower tube 604, such that a rotational force applied to the upper tube 602 via the handlebars 38 is transmitted to the lower tube 604 and ultimately to the ski 30. The snow vehicle 10 of FIG. 14 employs an external joint 610 that couples the upper tube 602 and the lower tube 604 to prevent relative rotation the upper tube 602 and the lower tube 604 while still permitting telescopic movement of the tubes 602 and 604. The external joint includes an upper arm 612 rotatably coupled to the upper tube 602 of the suspension tube assembly 600. A lower arm 614 is rotatably coupled to the lower tube 604 of the suspension tube assembly 600. The upper arm 612 and lower arm 614 are rotatably coupled to one another at a joint 616, such that the arms 612, 614 can rotate relative to one another to permit a distance between the opposite ends of the arms 612, 614 to vary. The joint 610 couples the upper tube 602 and lower tube 604 of the suspension tube assembly 600 to prevent relative rotation between the tubes 602, 604 while permitting telescopic motion therebetween. Although illustrated on a forward side of the suspension tube assembly 600, in other arrangements, the external joint 610 may be located elsewhere. For example, the joint 610 may be coupled to a rear side of the suspension tube assembly 600 between the suspension tube and the body frame 20 of the vehicle 10. In other arrangements, the joint 610 may be positioned on one or both sides of the suspension tube assembly 600.

The snow vehicle 10 of FIG. 15 also incorporates a single suspension tube assembly 600. However, the front suspension 22 of the vehicle 10 of FIG. 15 omits the external joint 610 of FIG. 14 and instead incorporates another mechanism for preventing rotation between the upper tube 602 and the lower tube 604. The suspension tube assembly 600 of the vehicle 10 of FIG. 15 incorporates a mechanism within the upper tube 602 that prevents rotation between the upper tube 602 and the lower tube 604. Such an arrangement has the advantage of omitting the external joint 610, which eliminates the need to provide clearance for the external joint 610, eliminates a number of external pivot points that may require maintenance, and provides a cleaner external appearance. In some arrangements, the snow vehicle 10 may incorporate the external joint 610 in addition to an internal mechanism the prevent relative rotation between the tubes 602, 604, such as one or more of the mechanisms illustrated in FIGS. 16A-16D.

Figure 16:
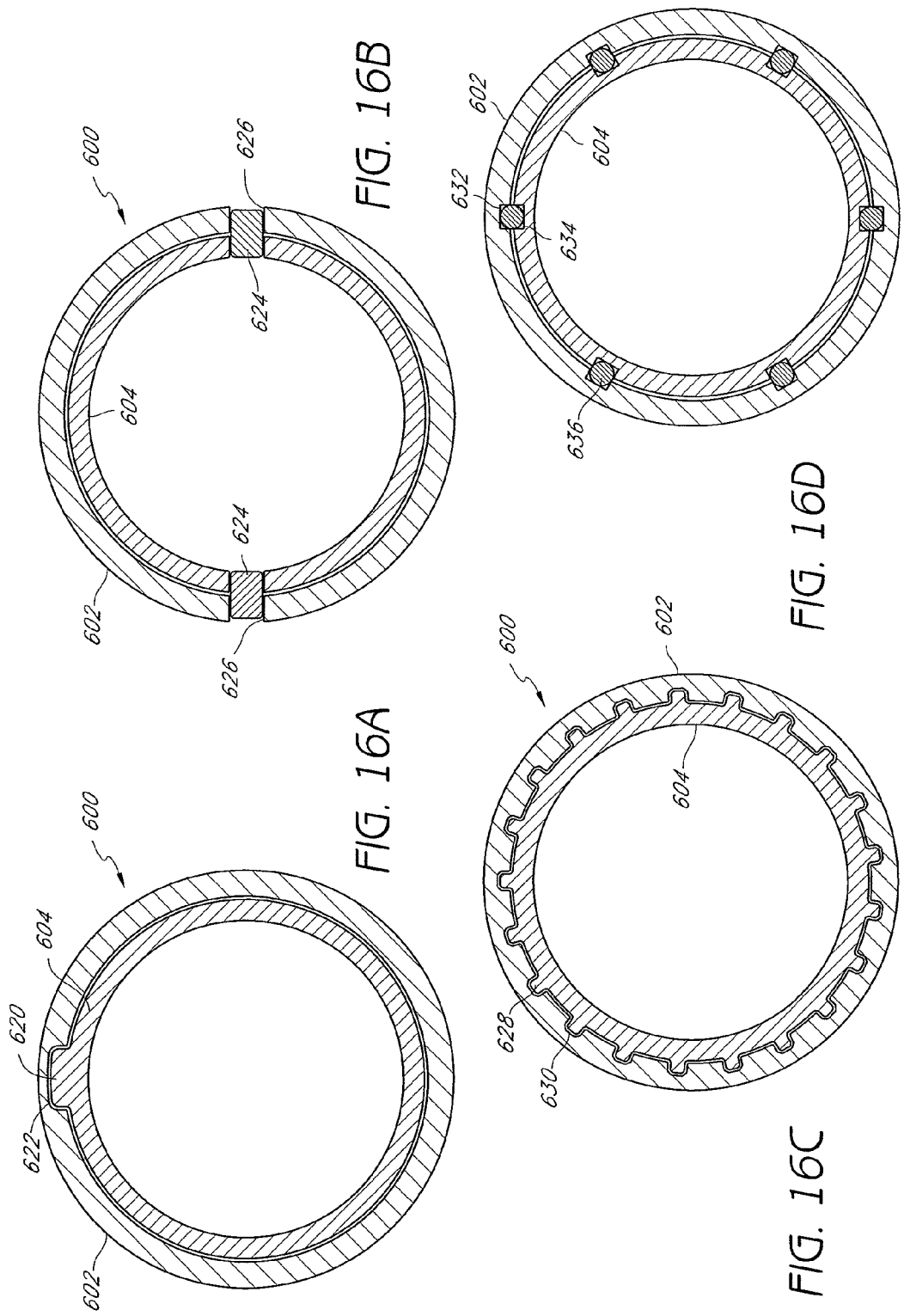
FIGS. 16A-16D are cross-sectional views of the single telescoping tube assembly of the personal snow vehicle of FIG. 15, taken along line 16-16 of FIG. 15.

With reference to FIG. 16A, a cross-sectional view of the suspension tube assembly 600 is shown, with internal components, such as the spring and damper, omitted for clarity. In the illustrated arrangement, the inner tube or lower tube 604 includes a protrusion 620 that is received within a recess or slot 622 of the outer or upper tube 602. The protrusion or key 620 is generally rectangular in shape and preferably extends along a length of the lower tube 604. The slot 622 is sized and shaped to receive the key 620 with little clearance therebetween. The slot 622 also extends along a length of the upper tube 602. Preferably, the key 620 and slot 622 are configured to transmit a rotational force applied to one of the tubes 602, 604 to the other of the tubes 602, 604. Such forces may occur during use of the vehicle 10 include forces applied by a rider of the snow vehicle 10 via the handlebars 38 or forces introduced due to the ski 30 moving along the ground. The key 620 and slot 622 extend a suitable distance along the length of the tubes 604, 602, respectively, such that a desirable distance of suspension travel of the suspension tube assembly 600 is permitted. However, in a preferred arrangement, the key 620 and slot 622 are completely contained within the upper tube 602. With such an arrangement, a conventional, circular seal may be used to maintain a fluid tight seal between an external surface of the lower tube 604 and an internal surface of the upper tube 602.

With reference to FIG. 16B, an alternative mechanism for preventing rotation between the upper tube 602 and the lower tube 604 is illustrated. In FIG. 16B, the lower tube 604 carries one or more pins 624 which slide in slots 626 defined by the upper tube 602. In the illustrated arrangement, a pair of pins 624 and slots 626 is provided on opposing sides of the suspension tube assembly 600. However, other suitable numbers of pins 624 and slots 626 may be provided to meet specific design criteria, such as strength and durability characteristics. In addition, in alternative arrangements, the pins 624 may be carried by the upper tube 602 and the slots 626 defined by the lower tube 604.

With reference to FIG. 16C, the upper tube 602 and lower tube 604 are coupled via a splined connection. In particular, the lower tube 604 defines a plurality of protruding, elongated splines 628 that extend radially outward from an outer surface of the tube 604. The splines 628 are received within elongated recesses 630 defined by an inner surface of the upper tube 602. The splines 628 and recesses 630 operate to prevent relative rotation of the upper tube 602 and the lower tube 604 while permitting telescopic movement thereof.

With reference to FIG. 16D, yet another mechanism for preventing rotation between the upper tube 602 and the lower tube 604 is illustrated. In the arrangement of FIG. 16D, an inner surface of the upper tube 602 defines a plurality of slots 632. An outer surface of the lower tube 604 defines a plurality of slots 634 that are aligned with the slots 632 of the upper tube 602. One or more interference members, such as hardened spherical members 636, are positioned within each of the cooperating slots 632 and 634 and are sized to interfere with counteracting rotational forces applied to the tubes 602 and 604 to prevent relative rotation of the tubes 602, 604.

FIGS. 16A-16D illustrate several preferred mechanisms for inhibiting relative rotation of the upper tube 602 and the lower tube 604 of the suspension tube assembly 600. However, other suitable mechanisms may also be used. For example, the upper tube 602 and lower tube 604 may be constructed with a non-circular cross-sectional shape, such as an ovular shape or include one or more flattened surfaces. In one arrangement, these non-circular cross-sectional areas would be located between circular sections of the tubes 602, 604. Seals to control fluid pressures would be located on the circular sections.

Figure 17:
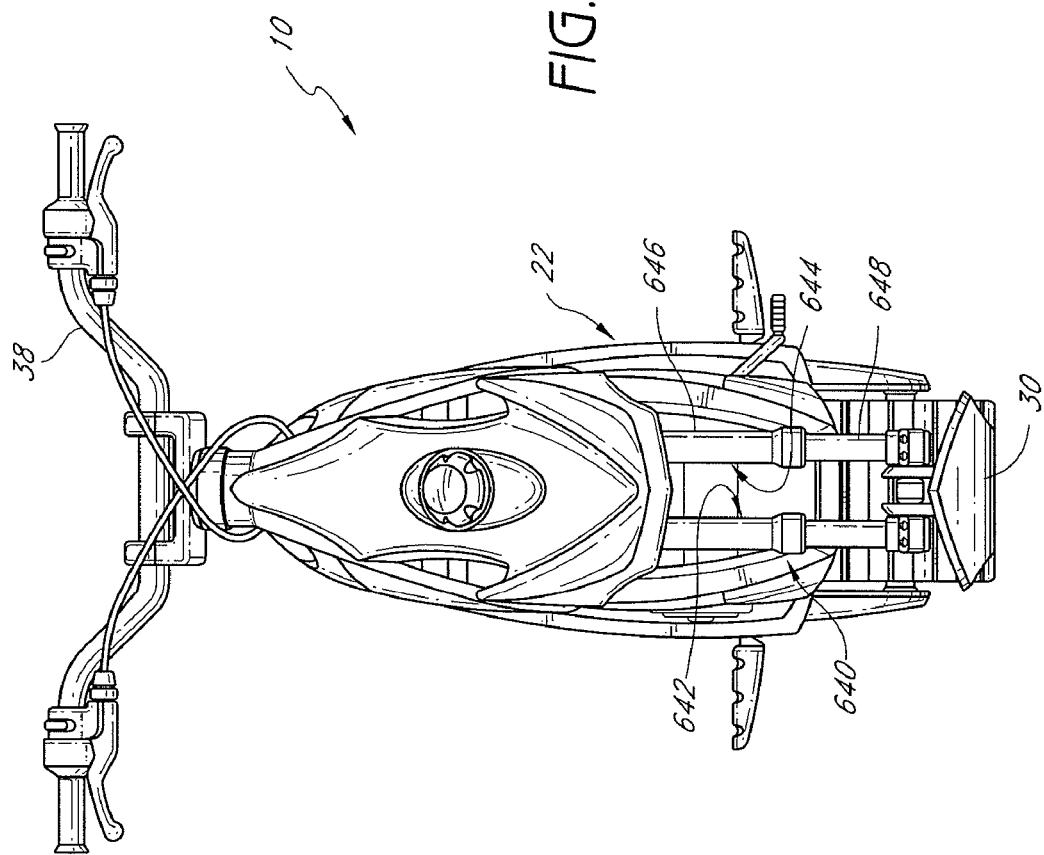
FIG. 17 is a front view of a personal snow vehicle incorporating a front suspension fork arrangement.

FIG. 17 illustrates a snow vehicle 10 including yet another arrangement of a front suspension 22. The front suspension 22 of the snow vehicle 10 of FIG. 17 incorporates a front fork assembly 640. The front fork assembly 640 is similar to a motorcycle front suspension assembly and includes a first fork leg 642 and a second fork leg 644. Each of the fork legs 642, 644 include an upper fork tube 646 and a lower fork tube 648. The fork tubes 646 and 648 are telescopically engaged with one another.

The suspension fork 640 is coupled to the handlebars 38 through any suitable mechanism. For example, one or more triple clamp members (not shown) may couple the upper ends of the fork legs 642, 644 with the steering shaft (not shown), as will be appreciated by one of skill in the art. Furthermore, the lower end of the suspension fork 640 may be coupled to the ski 30 by any suitable mechanism and, preferably, by a mechanism that permits tool-less connection and removal of the ski to the suspension fork 640, such as the attachment mechanism 154 described above with reference to FIG. 5.

The suspension fork 640 is also configured to provide both a spring force and a damping force in response to relative movement between the upper tubes 646 and the lower tubes 648. In one arrangement, each of the fork legs 642 and 644 provide both a spring force and a damping force. However, in alternative arrangements, one fork leg 642 or 644 may be configured to provide a spring force and the other fork leg 642 ore 644 may be configured to provide a damping force. In addition, other arrangements are possible wherein either or both of the spring force and damping force are produced by suspension members other than the fork legs 642, 644, such as by an external shock absorber, for example.

Figure 18A:
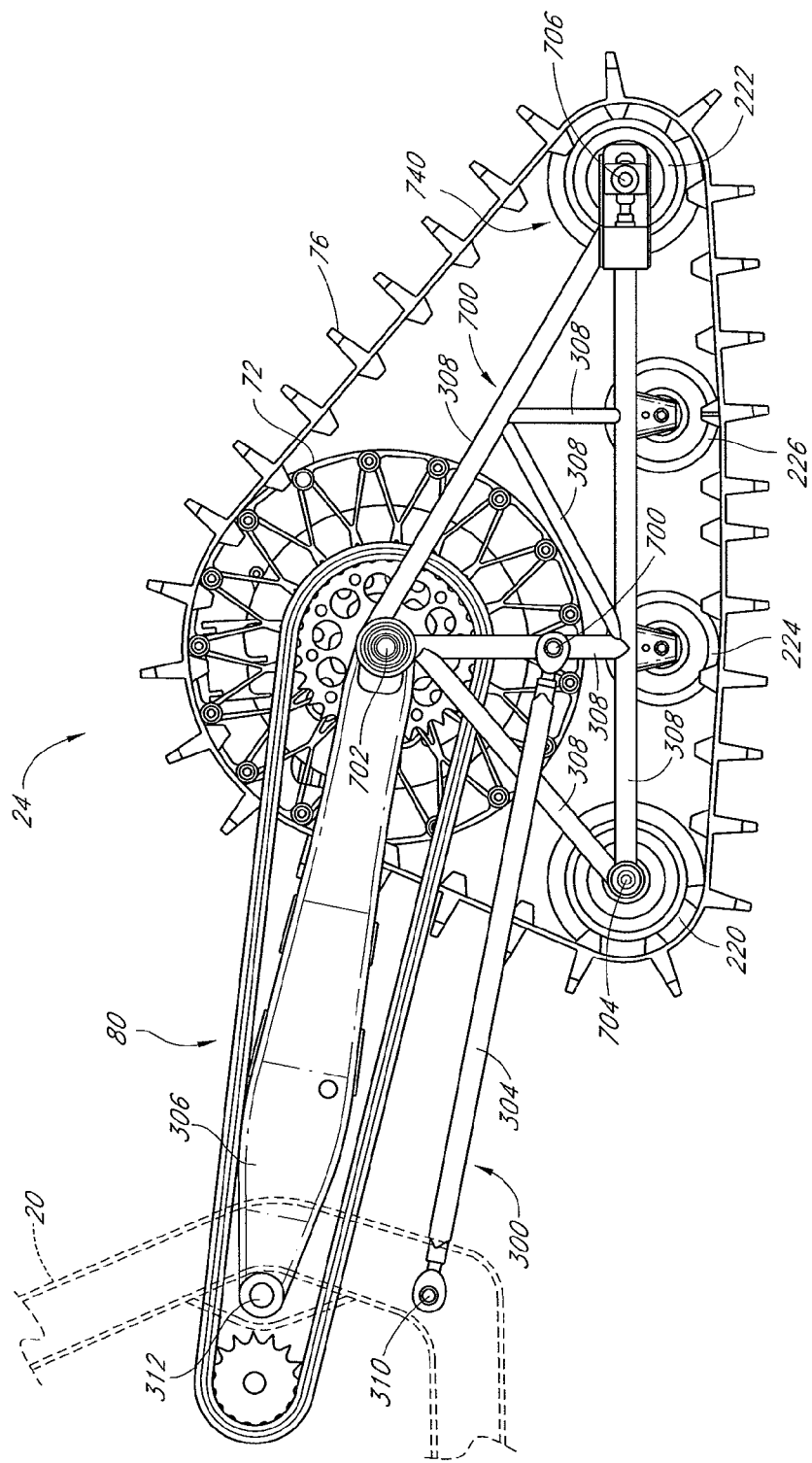
FIG. 18A is a side elevational view of a modification of the rear suspension and track drive of FIGS. 1-10.
Figure 18B:
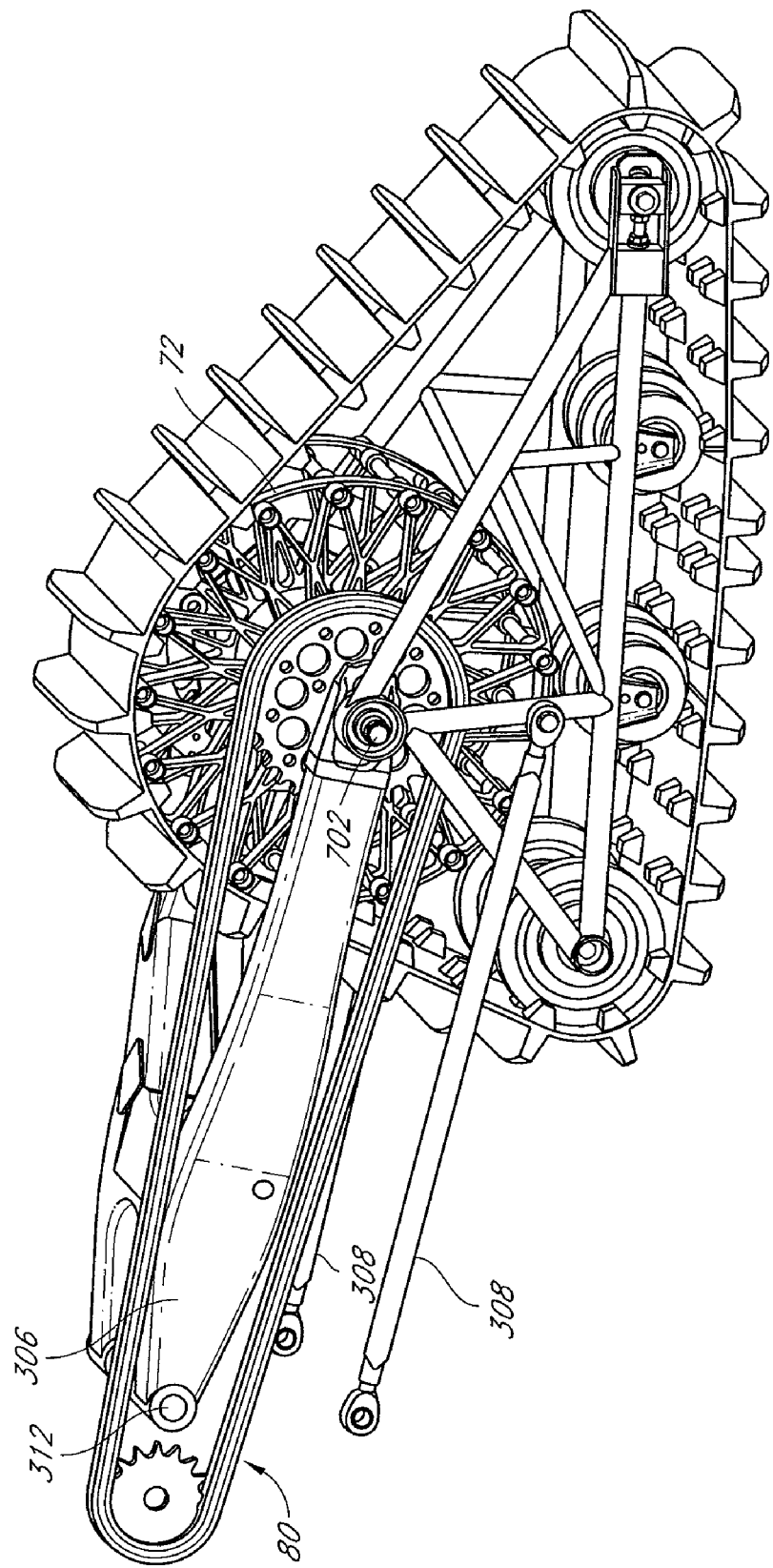
FIG. 18B is a left side perspective view of the rear suspension and track drive of FIG. 18A.
Figure 18C:
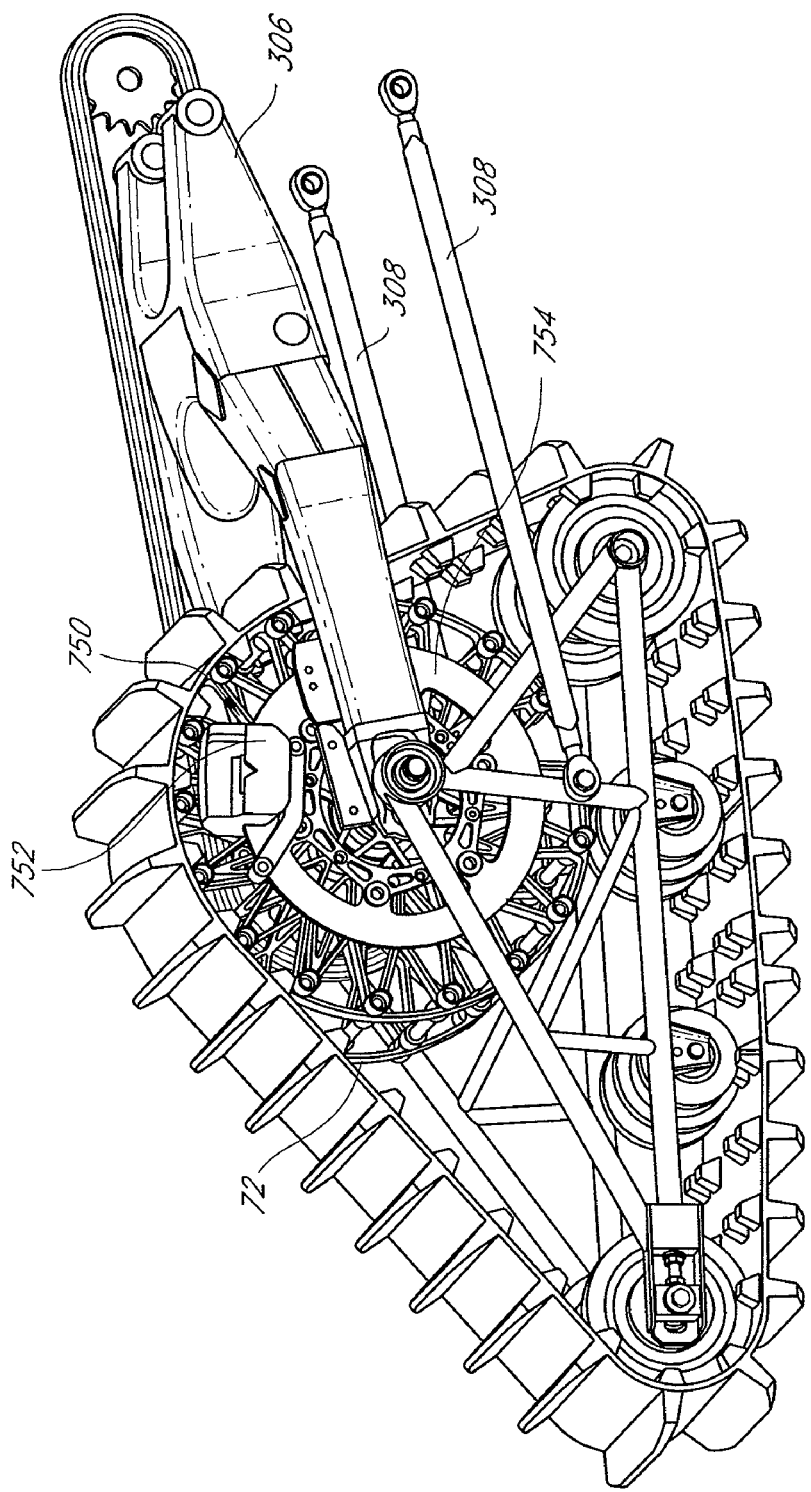
FIG. 18C is a right side perspective view of the rear suspension and track drive of FIG. 18A.

With reference to FIGS. 18A-18C, a modification of the rear suspension 24 of FIGS. 10A-10G is illustrated. Many aspects of the rear suspension 24 of FIGS. 18A-18C is similar to the rear suspension assembly 24 of FIGS. 10A-10G and, therefore, the same reference numerals are used to identify the same or similar components.

Similar to the rear suspension 24 of FIGS. 10A-10G, the rear suspension 24 of FIGS. 18A-18C includes a parallel linkage system 80. However, the rear suspension 24 of FIGS. 18A-18C is configured to provide an associated snow vehicle 10 with a lower and more forward center of gravity.

The parallel linkage system 80 includes a lower swing arm 304 and an upper swing arm 306. The lower swing arm 304 is coupled to the frame 20 of the snow vehicle 10 for rotation about a pivot axis 310. Similarly, the upper swing arm 306 is coupled to the frame 20 for rotation about the pivot axis 312. The lower swing arm 304 and the upper swing arm 306 cooperate to carry a track support 700. In the illustrated arrangement, the track support 700 is a frame constructed of a series of linkage members 308. The track support 700 is rotatably coupled to a rearward end portion of the lower swing arm 304 for rotation about a pivot axis 700 and, similarly, is rotatably supported by a rearward portion of the upper swing arm 306 for a rotation about a pivot axis 702.

In the arrangement of FIGS. 18A-18C, the drive wheel 72 is rotatable about the axis 702. In the illustrated arrangement, the drive wheel 72 is supported by a rearward end portion of the upper swing arm 306. The track support 700 supports a front main idler wheel 220 for rotation about a pivot axis 704 that is positioned forward of the axis 702 about which the drive wheel 72 rotates. In the illustrated arrangement, the pivot axis 704 of the front main idler wheel 220 is positioned forward of a leading edge of the drive wheel 72. The rear main idler wheel 222 is supported by the track support 700 at a location spaced rearwardly from the drive wheel 72 for rotation about an axis 706. The track support 700 may also rotatably support additional idler wheels, such as the illustrated subsidiary idler wheels 224 and 226 that are positioned between the front main idler wheel 220 and the rear main idler wheel 222. By positioning at least the front main idler wheel 220 forward of the rotational axis 702 of the drive wheel 72, the rear suspension 24 of FIGS. 18A-18C provides the associated snow vehicle 10 with a shorter overall length and moves the center of gravity forward in comparison with a snow vehicle 10 incorporating the rear suspension 24 shown in FIGS. 10A-10G. In addition, the upper swing arm 306 supports the drive wheel 72 and is positioned lower relative to the body frame 20 than the upper swing arm 306 in the rear suspension 24 of FIGS. 10A-10G. In addition, the lower swing arm 304 of the rear suspension of FIGS. 16A-16C is positioned lower relative to the body frame 20 than the corresponding lower swing arm 304 of the rear suspension 24 of FIGS. 10A-10G to lower the center of gravity of the personal snow vehicle 10.

The parallel linkage system 80 operates to maintain the track support 700 and, thus, the track 76 at a desired attitude throughout the suspension motion of the rear suspension 24. In some arrangements, the parallel linkage 80 is configured to maintain the orientation of a lower surface of the track 76 in an uncompressed position of the rear suspension 24 substantially parallel with the orientation of the lower surface of the track 76 in a compressed position of the rear suspension 24. In some arrangements, the lower surface of the track 76 in any position throughout the suspension travel of the rear suspension 24 is substantially parallel to the lower surface of the track 76 in any other position throughout the suspension travel.

In some arrangements, one or more members of the parallel linkage system 80 may be configured to change in length, or to be compliant. For example, in some arrangements of the rear suspension 24 illustrated in FIGS. 18A-18C, the lower swing arm 304 may be compliant and, in particular, may be configured to extend in length from the length illustrated in FIGS. 18A-18C to permit the track support 700 to rotate upwardly about the pivot axis 702 relative to its position shown in FIGS. 18A-18C. Such an arrangement would permit the attitude of the track 76 to change, such as in the event of a rearward portion of the track 76 contacting the ground prior to the remainder of the track 76, such as when the vehicle 10 lands from a jump. In one arrangement, a shock absorber may be incorporated within the lower swing arm 304 to provide the swing arm 304 with a compliant nature. Furthermore, the lower swing arm 304 may be adjustable in length to permit fine tuning of an orientation of the frame support 700 and, thus, the track 76.

The rear suspension 24 may also include a track adjustment mechanism 740 which permits adjustment of a tension of the track 76. In the illustrated arrangement, the adjustment mechanism 740 permits the rotation axis 706 of the rear main idler wheel 222 to be moved relative to the track support 700. The adjustment mechanism 740 is similar to the chain tension adjustment mechanisms commonly found on motorcycles. The adjustment mechanism 740 may also permit sufficient slack to be introduced into the track 76, such that the track can be removed from the drive wheel 72 and idler wheels 720, 722, 724, 726. As described above, in some arrangements, the lower swing arm 304 and upper swing arm 306 may be provided on only one side of the track 76, such that the track 76 may be easily removed from the opposite side of the rear suspension 24.

With reference to FIG. 18C, in some arrangements, the snow vehicle 10 may incorporate a brake mechanism 750. In the illustrated arrangement, the brake mechanism 750 is a disc brake in which a disc brake caliper 752 is coupled to the upper swing arm 306 and a disc brake rotor 754 is coupled for rotation with the drive wheel 72. The caliper 752 is configured to apply a squeezing force to the rotor 754 to slow the rotational velocity of the drive wheel 72. The brake mechanism 750 may be controlled by any suitable type of operator control arrangement, such as a foot pedal positioned near one of the foot pegs 62 (FIG. 1) or a hand control positioned on the handlebars 38. As discussed above, other brake mechanisms are possible, such as one or more strakes that normally reside in an un-extended position on the vehicle body, steering ski or drive track mechanism. The braking system can also include an actuator. In one embodiment, the actuator is manually controlled and, when moved, causes the braking strake to extend from the vehicle and engage the ground.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A track-driven vehicle, comprising:
   a vehicle body;
   a front support coupled to the vehicle body to support a front portion of the vehicle body;
   an engine;
   a track drive mechanism having an endless track driven by the engine;
   a rear suspension system that movably supports the track drive mechanism relative to the vehicle body; the rear suspension system comprising:
      a lower swingarm movably coupled to the vehicle body;
      an upper swingarm movably coupled to the vehicle body;
      a rear linkage coupled to the upper swingarm for rotation about a first axis and coupled to the lower swingarm for rotation about a second axis;
   wherein the first axis is located above an area bounded by the endless track, and wherein a drive wheel of the track drive mechanism is carried by the lower swingarm.

2. The vehicle of claim 1, wherein at least a portion of the upper swingarm is compliant to permit a length of the upper swingarm to change.

3. The vehicle of claim 1, wherein the compliant portion of the upper swingarm comprises a shock absorber.

4. The vehicle of claim 1, wherein the front support comprises a front suspension system that movably supports a ski.

5. The vehicle of claim 4, wherein the ski defines at least four edges which are capable of engaging the surface on which the vehicle travels.

6. The vehicle of claim 4, wherein the front suspension system comprises a linkage assembly and at least one shock absorber.

7. The vehicle of claim 4, wherein the front suspension system comprises a front fork having a first telescoping tube assembly and a second telescoping tube assembly.

8. The vehicle of claim 4, wherein the front suspension system comprises a single telescoping tube assembly.

9. The vehicle of claim 1, further comprising a freewheel mechanism operably positioned between the engine and the endless track, wherein the freewheel mechanism permits the endless track to rotate faster than a speed at which it would otherwise be driven by the engine.

10. The vehicle of claim 1, further comprising a heat exchanger mounted on the vehicle and configured to deliver heat to at least one of a handlebar of the vehicle, a seat of the vehicle and an area proximate a foot peg of the vehicle.

11. The vehicle of claim 1, further comprising a camera mount on a handlebar of the vehicle to removably support a camera.

12. A track-driven vehicle, comprising:
    a vehicle body;
    a front support coupled to the vehicle body to support a front portion of the vehicle body;
    an engine;
    a track drive mechanism having an endless track driven by the engine;
    a rear suspension system that movably supports the track drive mechanism relative to the vehicle body; the rear suspension system comprising:
       a lower swingarm movably coupled to the vehicle body;
       an upper swingarm movably coupled to the vehicle body;
       a rear linkage coupled to the upper swingarm for rotation about a first axis and coupled to the lower swingarm for rotation about a second axis;
       wherein a drive wheel of the track drive mechanism is carried by the lower swingarm.

13. The vehicle of claim 12, wherein at least a portion of the upper swingarm is compliant to permit a length of the upper swingarm to change.

14. The vehicle of claim 12, wherein the compliant portion of the upper swingarm comprises a shock absorber.

15. The vehicle of claim 12, wherein the front support comprises a front suspension system that movably supports a ski.

16. The vehicle of claim 15, wherein the ski defines at least four edges which are capable of engaging the surface on which the vehicle travels.

17. The vehicle of claim 15, wherein the front suspension system comprises a linkage assembly and at least one shock absorber.

18. The vehicle of claim 15, wherein the front suspension system comprises a front fork having a first telescoping tube assembly and a second telescoping tube assembly.

19. The vehicle of claim 15, wherein the front suspension system comprises a single telescoping tube assembly.

20. The vehicle of claim 12, further comprising a freewheel mechanism operably positioned between the engine and the endless track, wherein the freewheel mechanism permits the endless track to rotate faster than a speed at which it would otherwise be driven by the engine.

21. The vehicle of claim 12, further comprising a heat exchanger mounted on the vehicle and configured to deliver heat to at least one of a handlebar of the vehicle, a seat of the vehicle and an area proximate a foot peg of the vehicle.

22. The vehicle of claim 12, further comprising a camera mount on a handlebar of the vehicle to removably support a camera.

* * * * *